US012648891B2

(12) United States Patent
Zhou

(10) Patent No.: US 12,648,891 B2
(45) Date of Patent: Jun. 9, 2026

(54) MASSAGER

(71) Applicant: Dongguan Mengma Electronic Technology Co., Ltd., Dongguan City (CN)

(72) Inventor: Dongtao Zhou, Dongguan City (CN)

(73) Assignee: Dongguan Mengma Electronic Technology Co., Ltd., Dongguan City (CN)

( * ) Notice: Subject to any disclaimer, the term of this patent is extended or adjusted under 35 U.S.C. 154(b) by 0 days.

(21) Appl. No.: 19/057,863

(22) Filed: Feb. 19, 2025

(65) Prior Publication Data

US 2025/0186299 A1 Jun. 12, 2025

Related U.S. Application Data

(63) Continuation-in-part of application No. 18/122,731, filed on Mar. 17, 2023.

(30) Foreign Application Priority Data

Sep. 7, 2022 (CN) ........................ 202222380823.4

(51) Int. Cl.
*A61H 19/00* (2006.01)

(52) U.S. Cl.
CPC ...... *A61H 19/44* (2013.01); *A61H 2201/0119* (2013.01)

(58) Field of Classification Search
CPC ........ A61H 19/00; A61H 19/30; A61H 19/32; A61H 19/34
USPC .......................................................... 600/38
See application file for complete search history.

(56) References Cited

U.S. PATENT DOCUMENTS

| | | | | |
|---|---|---|---|---|
| 11,998,503 | B1 * | 6/2024 | Bonev | A61H 19/40 |
| 2017/0340501 | A1 * | 11/2017 | Lin | A61H 19/30 |
| 2019/0350800 | A1 | 11/2019 | Sloan | |
| 2021/0186798 | A1 | 6/2021 | Tang | |
| 2021/0401409 | A1 | 12/2021 | Nakamura | |
| 2023/0012669 | A1 * | 1/2023 | Liu | A61H 19/32 |
| 2025/0099320 | A1 * | 3/2025 | Chen | A61H 19/32 |

* cited by examiner

*Primary Examiner* — Charles A Marmor, II

(57) ABSTRACT

A massager, where an outer shell includes an accommodating cavity; and a driver is mounted in the accommodating cavity, the driver includes a reciprocating displacement drive assembly and a mounting portion, a connecting portion of the reciprocating displacement drive assembly penetrates a long-shaped guide hole on the outer shell and is connected with the mounting portion, and the massaging member is at least partially connected with the mounting portion in a plug-in manner, so that the reciprocating displacement drive assembly drives the mounting portion to perform a reciprocating linear displacement action to cause the massaging member to perform a reciprocating telescopic motion.

19 Claims, 23 Drawing Sheets

MASSAGER

RELATED APPLICATION DATA

This patent application is continuation in part of U.S. patent application Ser. No. 18/122,731 filed Mar. 17, 2023, which claims priority to Chinese Utility Application No. 202222380823.4, filed Sep. 7, 2022, the entire contents of which are incorporated herein by reference.

TECHNICAL FIELD

The present invention relates to the technical field of massage apparatus, and in particular relates to a massager.

BACKGROUND

Massage is a direct effect on special parts of human body to stimulate the nerves of the part being massaged, making the body feel comfortable. However, massage is generally performed by hands, and self-massage with hands has poor comfort. Therefore, massage bars and massage cylinders have been developed. However, the massage bars and the massage cylinders still need to be operated by hands, so the hands are easily fatigued and experience certain discomfort. Therefore, it is urgent to improve and obtain a hands-free massager structure.

SUMMARY

The present invention provides a massager designed to solve the above-mentioned technical problems, including: a massaging member; an outer shell comprising an accommodating cavity; and a driver mounted in the accommodating cavity, where the driver includes a reciprocating displacement drive assembly and a mounting portion located outside the outer shell in a suspended state, a connecting portion of the reciprocating displacement drive assembly penetrates a long-shaped guide hole on the outer shell and is connected with the mounting portion, and the massaging member is at least partially connected with the mounting portion in a plug-in manner, so that the reciprocating displacement drive assembly drives the mounting portion to perform a reciprocating linear displacement action along a first direction of the outer shell to cause the massaging member to perform a reciprocating telescopic motion.

According to an embodiment of the present invention, the reciprocating displacement drive assembly includes a motor, a rotating member and a reciprocating displacement member, the reciprocating displacement member is at least partially slidably connected with an inner wall of the accommodating cavity, a lower end of the reciprocating displacement member penetrates the long-shaped guide hole on the outer shell and is connected with the mounting portion, a long-shaped groove provided along a second direction of the outer shell is formed at the lower end of the reciprocating displacement member, an eccentric shaft is provided on the rotating member, the eccentric shaft is located in the long-shaped groove, and a rotating shaft of the motor is connected with a central position of the rotating member.

According to an embodiment of the present invention, the massaging member is in a columnar structure, a mounting cavity is provided on the mounting portion, the massaging member includes a columnar shell and a soft rubber layer wrapped around an outer surface of the columnar shell, and one end of the columnar shell is placed in the mounting cavity to be fixed to each other.

According to an embodiment of the present invention, the mounting cavity is fixedly provided with a connecting sleeve, and a slot and a buckle which are snap-fitted to each other are respectively provided on a peripheral side of one end of the columnar shell and an inner wall of the connecting sleeve.

According to an embodiment of the present invention, a vibration device is mounted in the columnar shell.

According to an embodiment of the present invention, the telescopic driver further includes a motor casing, the motor casing is arranged on a side of the outer shell corresponding to the rotating member, and the motor is arranged in a cavity of the motor casing.

According to an embodiment of the present invention, an opening is provided on the outer shell to allow a cavity in the outer shell and the cavity in the motor casing to communicate with each other, a cover plate is fixed at the opening, the cover plate abuts against an upper end of the motor, and the rotating shaft of the motor penetrates the cover plate.

According to an embodiment of the present invention, the massaging member is a flexible massage sleeve, a mounting cavity is provided on the mounting portion, the flexible massage sleeve is mounted in the mounting cavity, and a massage cavity is provided on the flexible massage sleeve.

According to an embodiment of the present invention, a suction pump and a solenoid valve are also provided in the accommodating cavity, an air inlet and an air outlet in communication with an inner cavity of the mounting portion are provided on the mounting portion, a suction port of the suction pump is connected with the air outlet by a pipeline, one port of the solenoid valve is connected with the air inlet by a pipeline, and a seal is provided between an end portion of the flexible massaging member and a port of the mounting cavity.

According to an embodiment of the present invention, the mounting portion is a cylinder, both ports of the cylinder are communicated with each other through the mounting cavity, the massaging member is a flexible massage cylinder, and both ends of the flexible massage cylinder form a first mouth portion in communication with the massage cavity therein.

According to an embodiment of the present invention, the massager further includes a mounting cylinder arranged coaxially with the mounting portion, the mounting cylinder and the mounting portion are spaced apart along the first direction of the outer shell, a flexible massage cylinder is mounted in the mounting cylinder, and the driver further includes a rotation drive assembly for driving the mounting cylinder to rotate.

According to an embodiment of the present invention, the rotation drive assembly includes a first gear and a second gear, the first gear and the second gear mesh with each other, the rotating member is a drive gear meshing with the first gear, and annular meshing teeth on the mounting portion at least partially pass through the outer shell to mesh with the second gear.

According to an embodiment of the present invention, an outer side of the outer shell is formed with a long-shaped recess provided along the first direction of the outer shell, the mounting portion is at least partially arranged in the long-shaped recess, and the long-shaped guide hole is arranged on an inner wall of the long-shaped recess or a side wall of a second mouth portion of the long-shaped recess.

According to an embodiment of the present invention, an outer side of the outer shell is formed with a long-shaped recess provided along the first direction of the outer shell, at least part of the mounting portion and at least part of the mounting cylinder are arranged in the long-shaped recess, and the long-shaped guide hole is arranged on an inner wall of the long-shaped recess or a side wall of the second mouth portion of the long-shaped recess.

According to an embodiment of the present invention, the reciprocating displacement drive assembly further includes at least one linear guide member fixed in the accommodating cavity, the reciprocating displacement drive assembly includes an actuating portion and at least one sliding portion, the long-shaped groove is arranged on a bottom surface of the actuating portion, the sliding portion is in a sliding fit with the linear guide member, a connecting portion of the sliding portion passes through the long-shaped guide hole of the outer shell and is connected with the mounting portion, and the actuating portion is connected with the at least one sliding portion.

According to an embodiment of the present invention, the at least one sliding portion is connected with the actuating portion by a connecting piece.

According to an embodiment of the present invention, a notch is provided on the long-shaped recess, a curved supplementing piece is mounted at the notch, and one end edge of the curved supplementing piece and one end edge of the notch form a through opening.

According to an embodiment of the present invention, the reciprocating displacement drive assembly further includes an inner shell fixed in the outer shell, the drive gear and the second gear are both located on an outer side of the inner shell, the motor is arranged in an inner cavity of the inner shell, and the rotating shaft of the motor penetrates the inner shell and is connected with the drive gear, and the drive gear and the second gear are respectively rotatably mounted on an outer side of the inner shell by the rotating shaft.

According to an embodiment of the present invention, a bracket partially located above the first gear and the second gear is fixedly mounted on an outer side of the inner shell, and an upper end of the rotating shaft on the first gear and the second gear is rotatably connected to the bracket; a positioning ring is sheathed on an outer periphery of the mounting cylinder, a baffle is provided above the mounting cylinder, the baffle is connected to the outer shell, a first plug-in portion is respectively provided on opposite sides of the positioning ring, a second plug-in portion is respectively provided on the bracket and the baffle, and the first plug-in portion and the second plug-in portion are plugged into each other for positioning; and the first plug-in portion is a plug-in column, and the second plug-in portion is a plug-in sleeve, or the first plug-in portion is a plug-in sleeve, and the second plug-in portion is a plug-in column, and the plug-in column is plugged into the plug-in sleeve.

According to an embodiment of the present invention, the reciprocating displacement drive assembly further includes an inner shell fixed in the outer shell, the motor, the solenoid valve and the suction pump are all arranged in an inner cavity of the inner shell, and the rotating shaft of the motor penetrates the inner shell and is connected with the rotating member.

The massager according to the present invention has the following beneficial effects: when the massager is not in operation, the massaging member is in contact with the part to be massaged, and then the massager is started, so that the rotating member rotates to drive the eccentric shaft to perform a circular motion, and then the reciprocating displacement member is driven to perform a long-stroke reciprocating displacement on the linear guide member to drive the massaging member to perform a long-stroke reciprocating motion, so that the massaging member automatically massages the part to be massaged, thereby solving the technical problem of hand fatigue due to operating massage bars and massage cylinders by hands, and thus improving service performance of the massager of the present invention.

Figure 1:
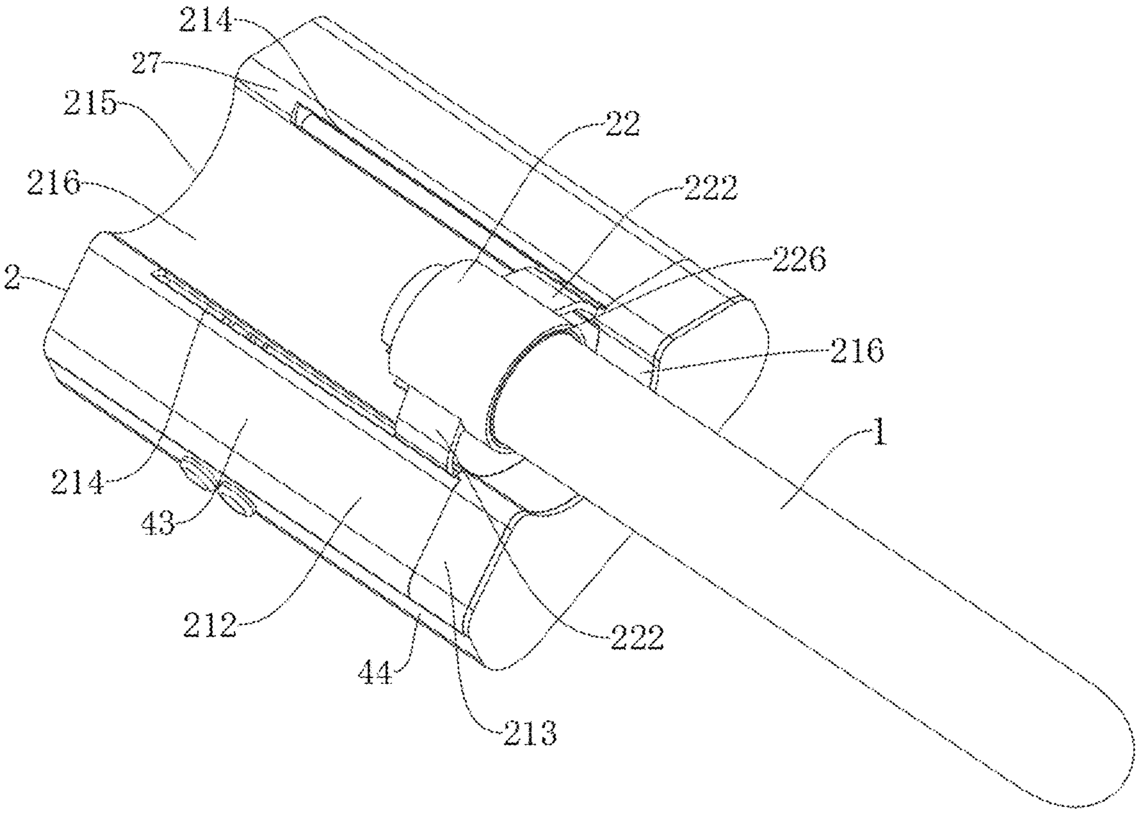
FIG. 1 is a structural diagram of a massaging member on a first massager in an extended state.

Reference numerals: 1. massaging member; 11. columnar shell; 12. soft rubber layer; 13. connecting sleeve; 14. massage cavity; 15. flexible protrusion; 16. step; 17. positioning ring; 18. baffle; 19. first mouth portion; 111. buckle; 131. slot; 171. annular groove; 172. first plug-in portion; 173. fixing portion; 181. second plug-in portion; 2. outer shell; 21. reciprocating displacement drive assembly; 22. mounting portion; 210. motor casing; 212. first shell; 213. second shell; 214. long-shaped guide hole; 215. long-shaped recess; 216. depression; 217. opening; 218. positioning column; 219. circular track groove; 220. linear guide member; 221. reciprocating displacement member; 222. connecting portion; 223. sliding portion; 224. actuating portion; 225. long-shaped groove; 226. mounting cavity; 227. positioning groove; 228. air inlet; 229. air outlet; 230. slot; 231. insertion shaft; 232. tapered head; 233. connecting piece; 241. eccentric shaft; 242. bearing; 243. guide portion; 23. motor; 24. rotating member; 25. cover plate; 26. grip handle; 27. second mouth portion; 3. vibration device; 4. control key; 5. first gear; 6. second gear; 7. mounting cylinder; 8. annular meshing tooth; 9. bracket; 10. battery; 43. upper shell; 44. lower shell; 412. notch; 431. curved supplementing piece; 433. first tapered groove; 434. pressing piece; 435. Second tapered groove; 436. connecting column; 51. inner shell; 56. suction pump; 57. solenoid valve; 511. connecting plate; 512. half shell; and 513. support column.

DESCRIPTION OF THE EMBODIMENTS

Figure 2:
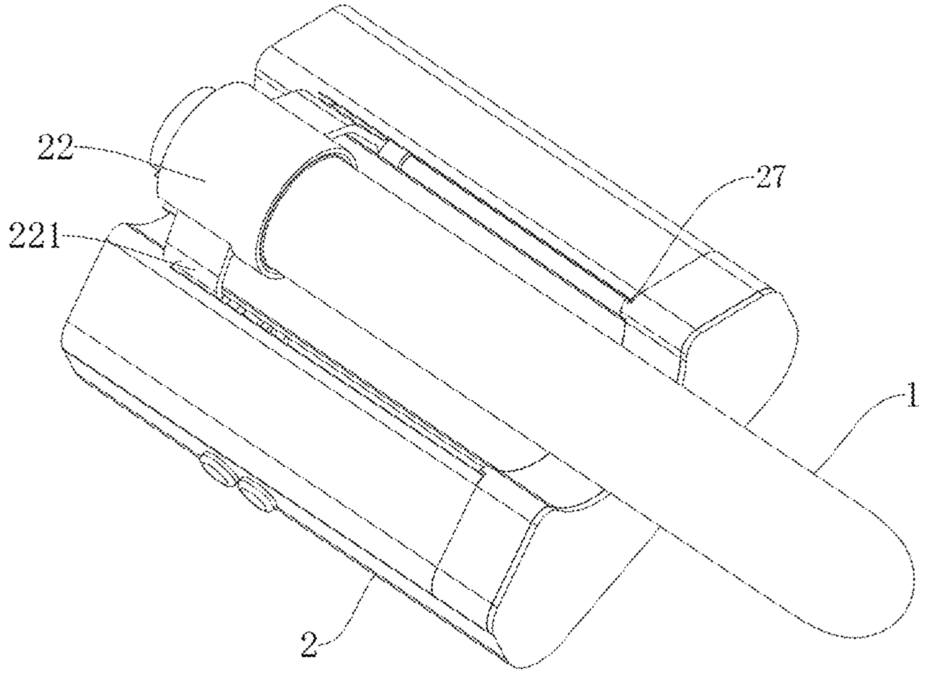
FIG. 2 is a structural diagram of the massaging member on the first massager in a retracted state.
Figure 3:
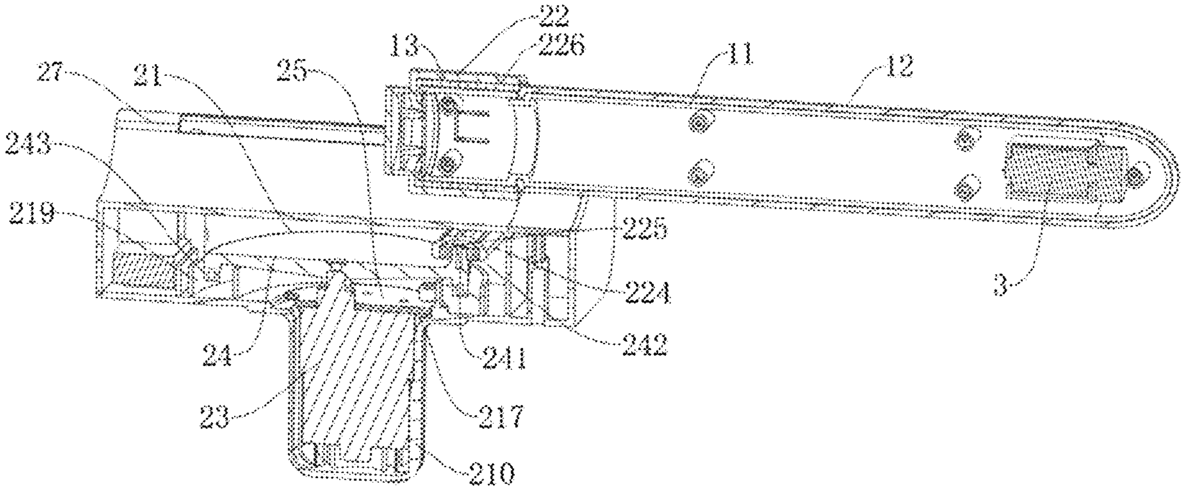
FIG. 3 is a first cross-sectional structural diagram of the first massager.
Figure 4:
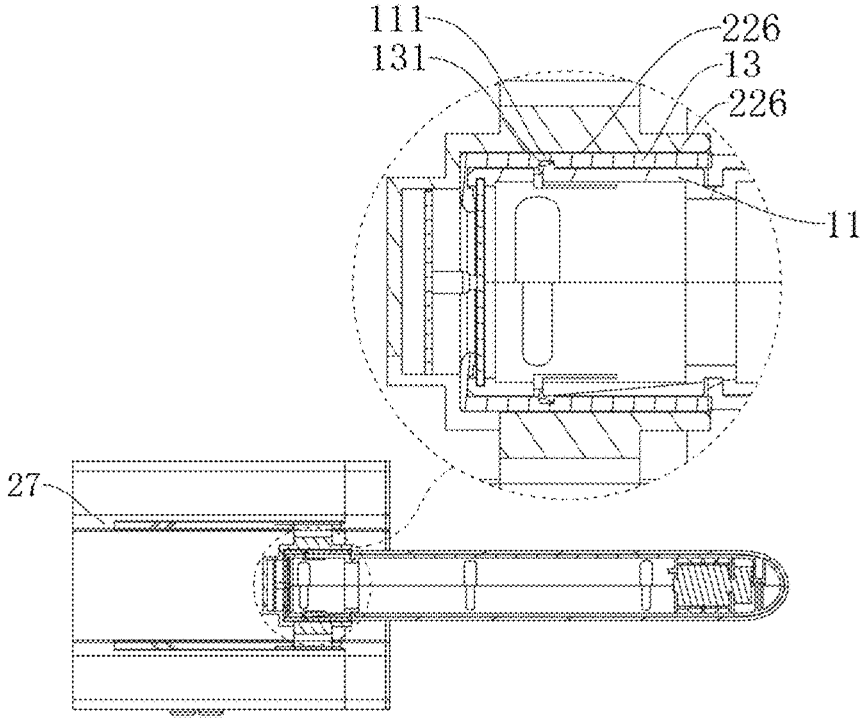
FIG. 4 is a second cross-sectional structural diagram of the first massager.
Figure 5:
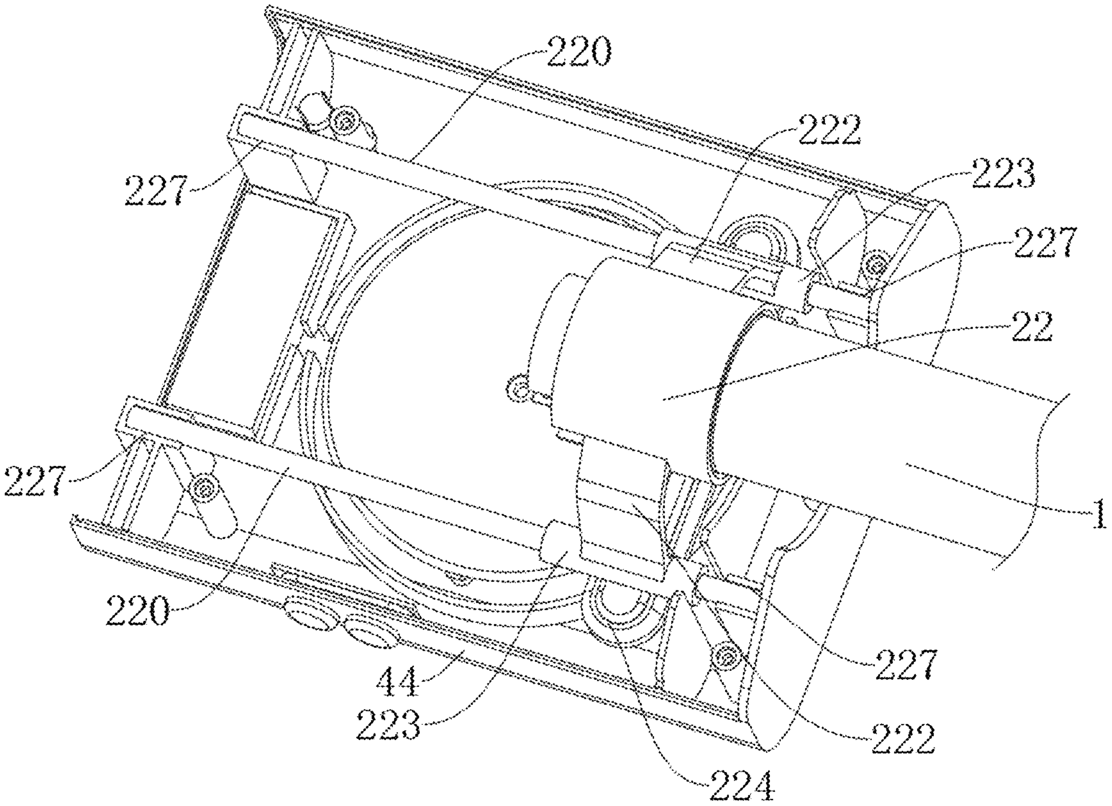
FIG. 5 is a first partial structural diagram of the first massager.
Figure 6:
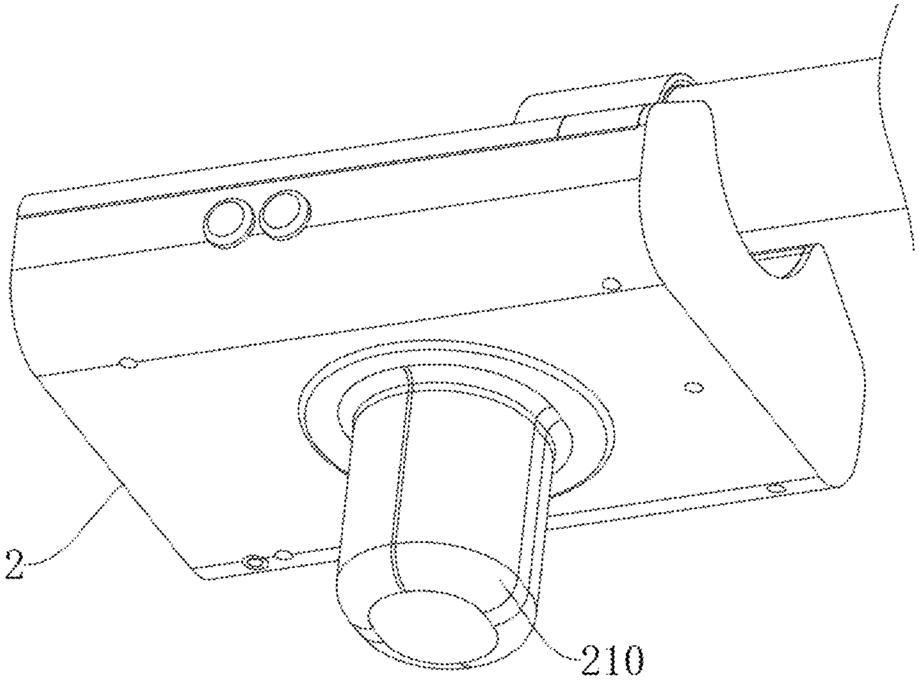
FIG. 6 is a second partial structural diagram of the first massager.
Figure 7:
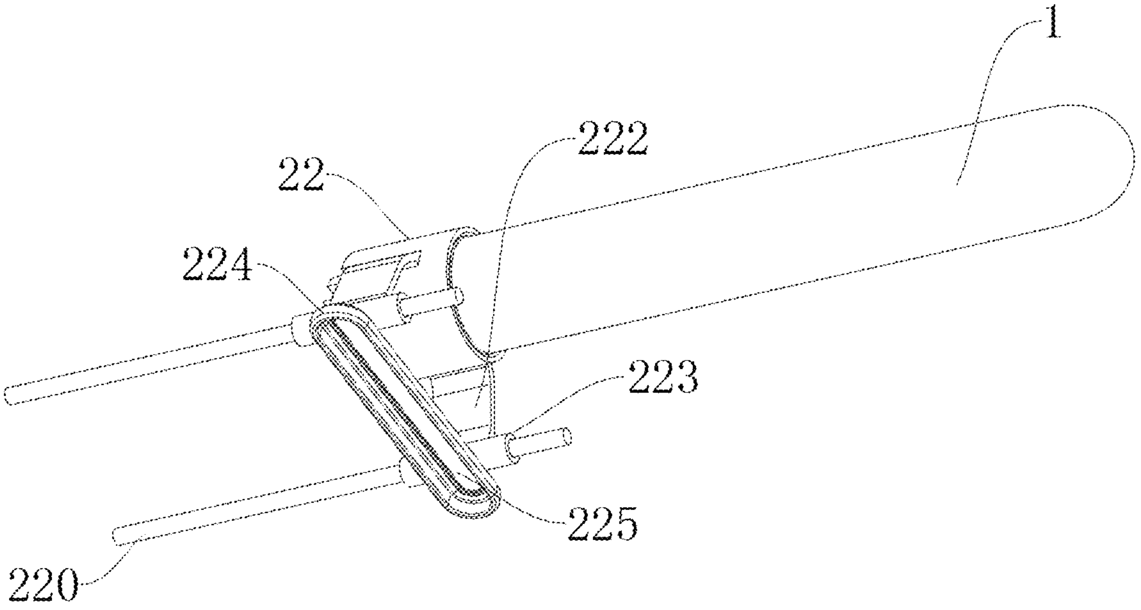
FIG. 7 is a structural diagram of the first massager with a reciprocating displacement member, a linear guide member and the massaging member cooperating with each other.
Figure 8:
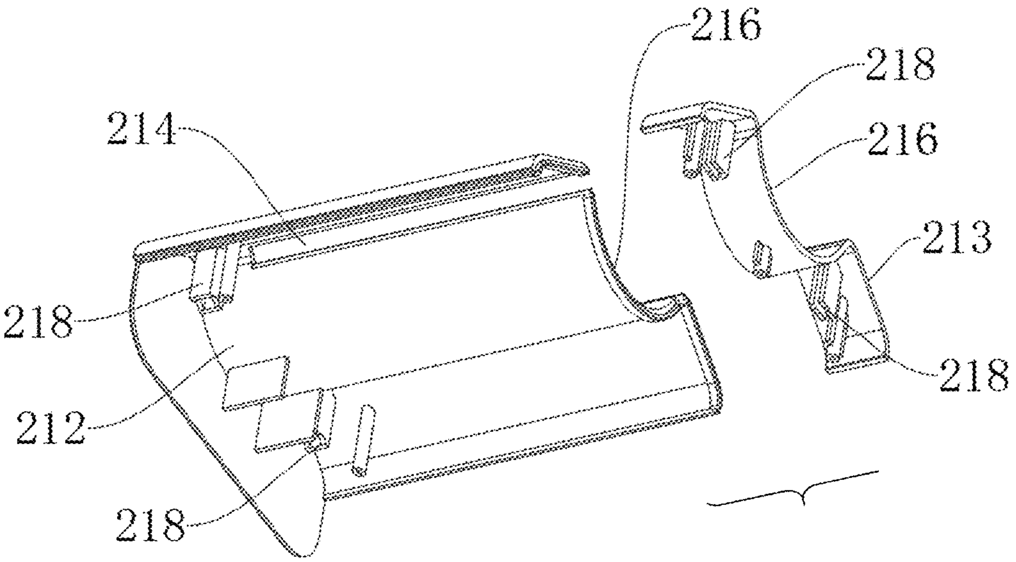
FIG. 8 is a structural diagram of a covering shell of the first massager.
Figure 9:
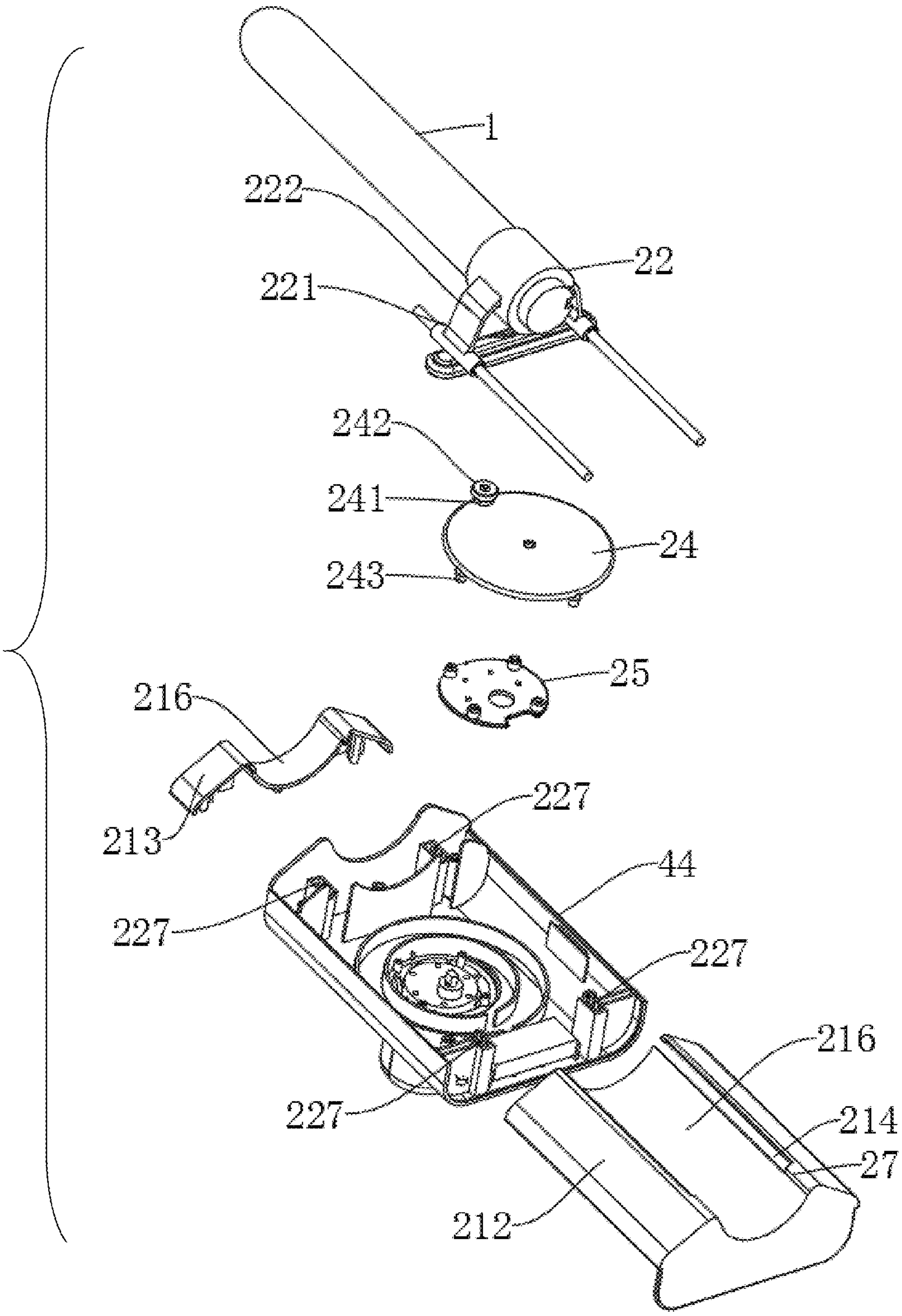
FIG. 9 is an exploded view of the first massager.
Figure 10:
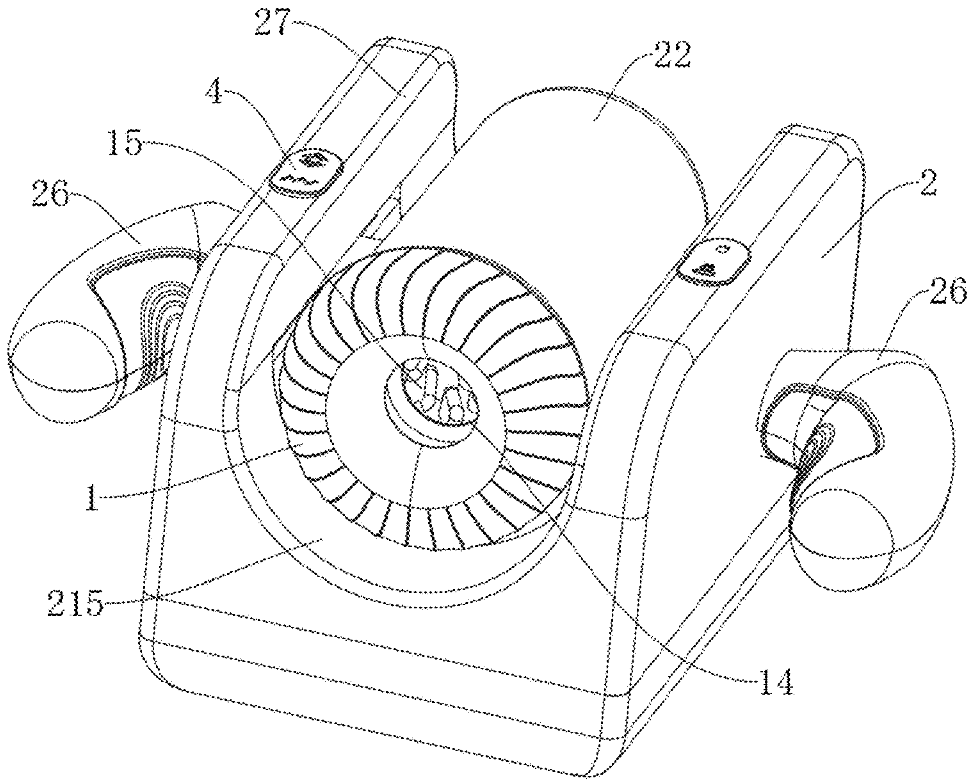
FIG. 10 is a first overall structural diagram of a second massager.
Figure 11:
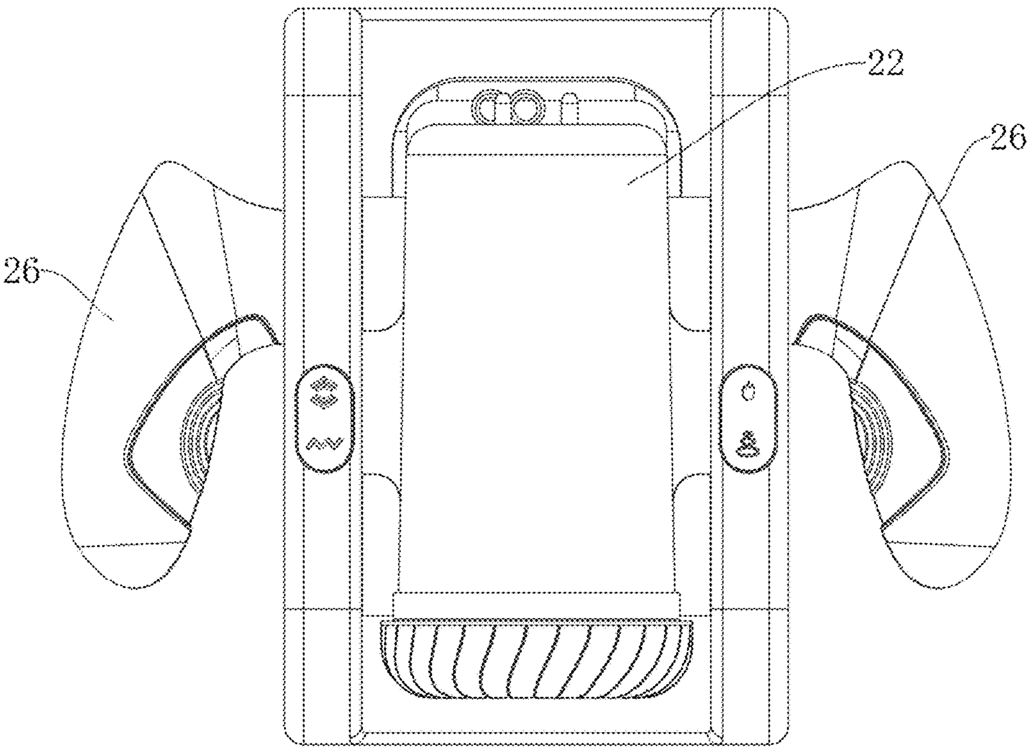
FIG. 11 is a second overall structural diagram of the second massager.
Figure 12:
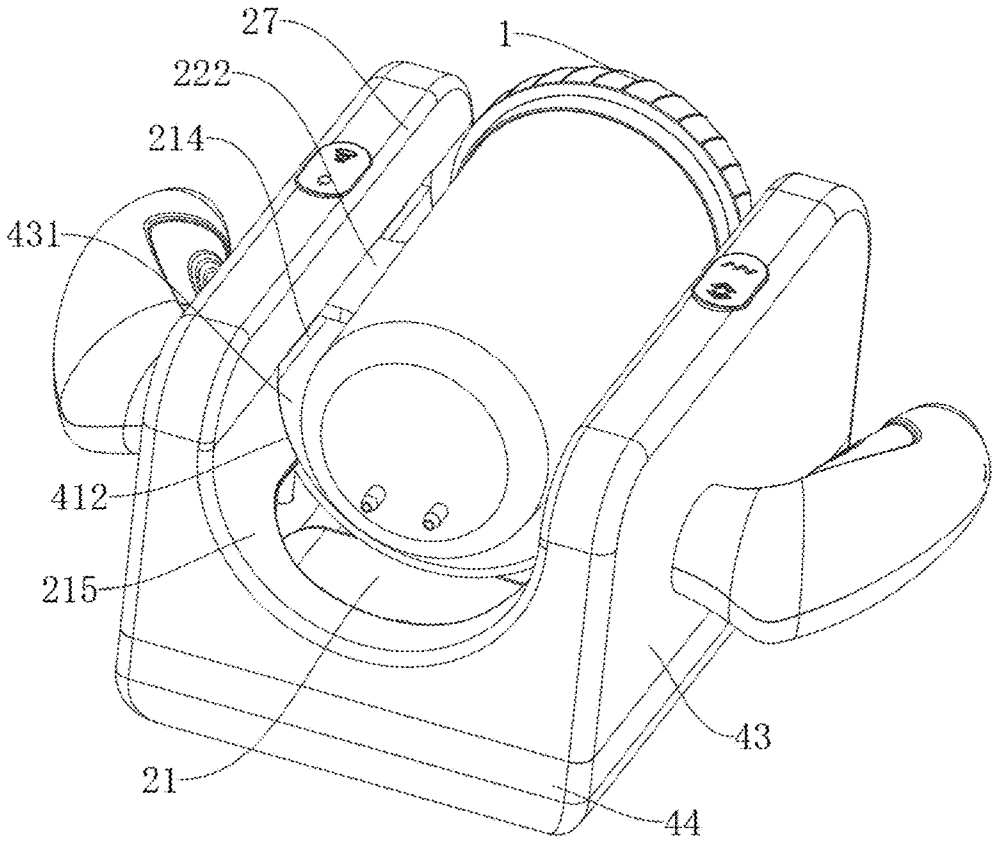
FIG. 12 is a third overall structural diagram of the second massager.
Figure 13:
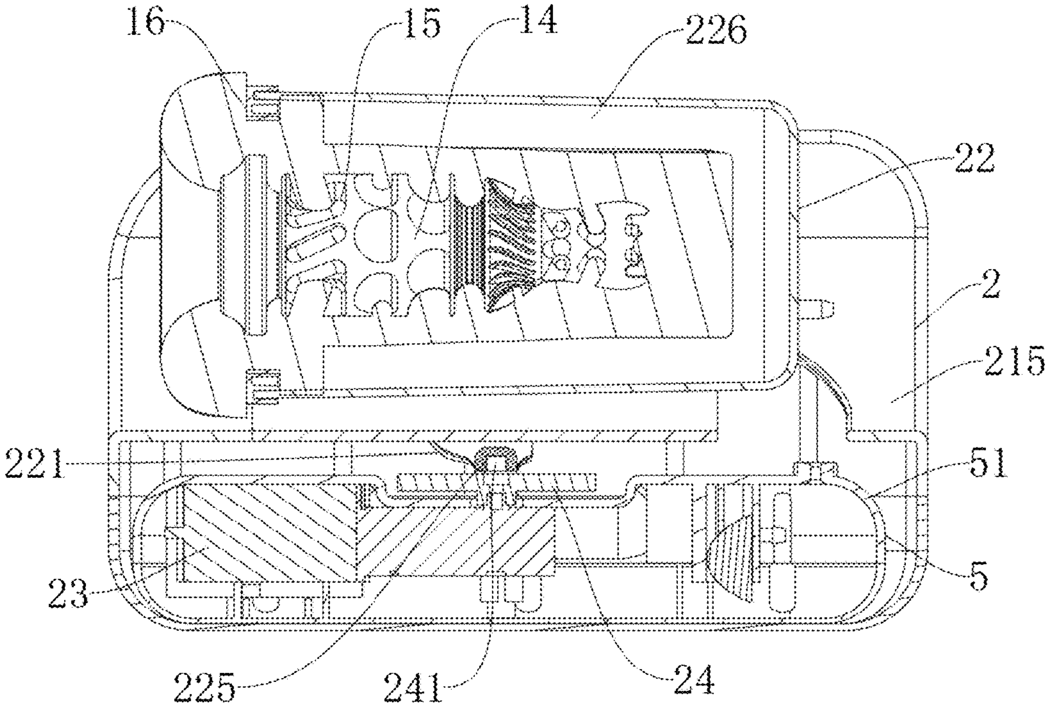
FIG. 13 is a first sectional view of a second massager.
Figure 14:
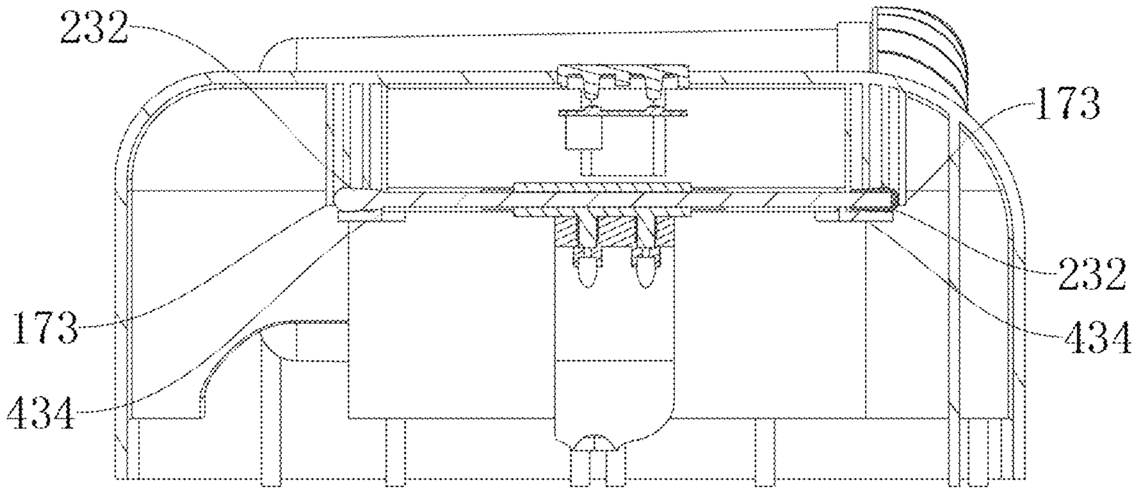
FIG. 14 is a second sectional view of a second massager.
Figure 15:
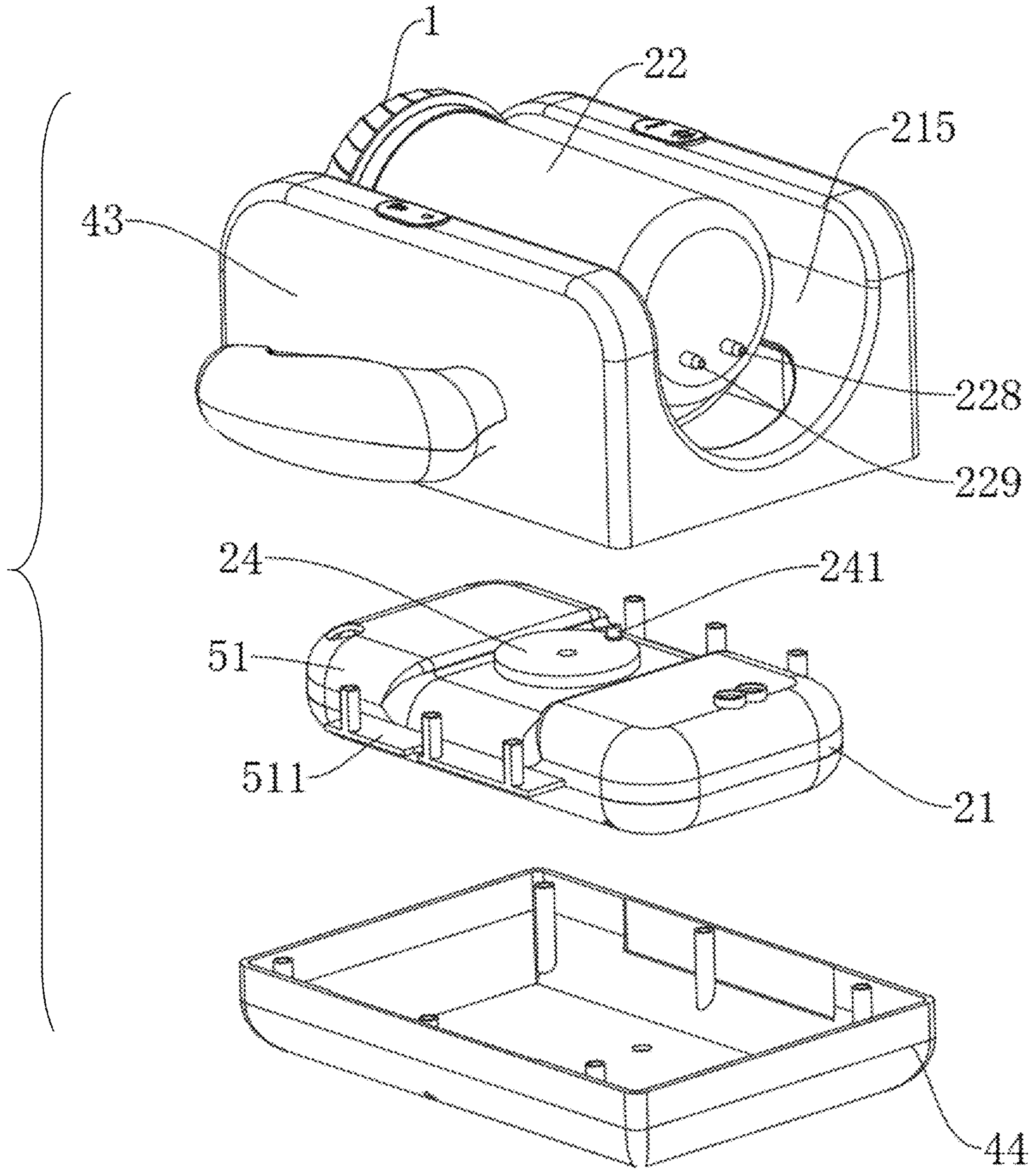
FIG. 15 is an exploded view of the second massager.
Figure 16:
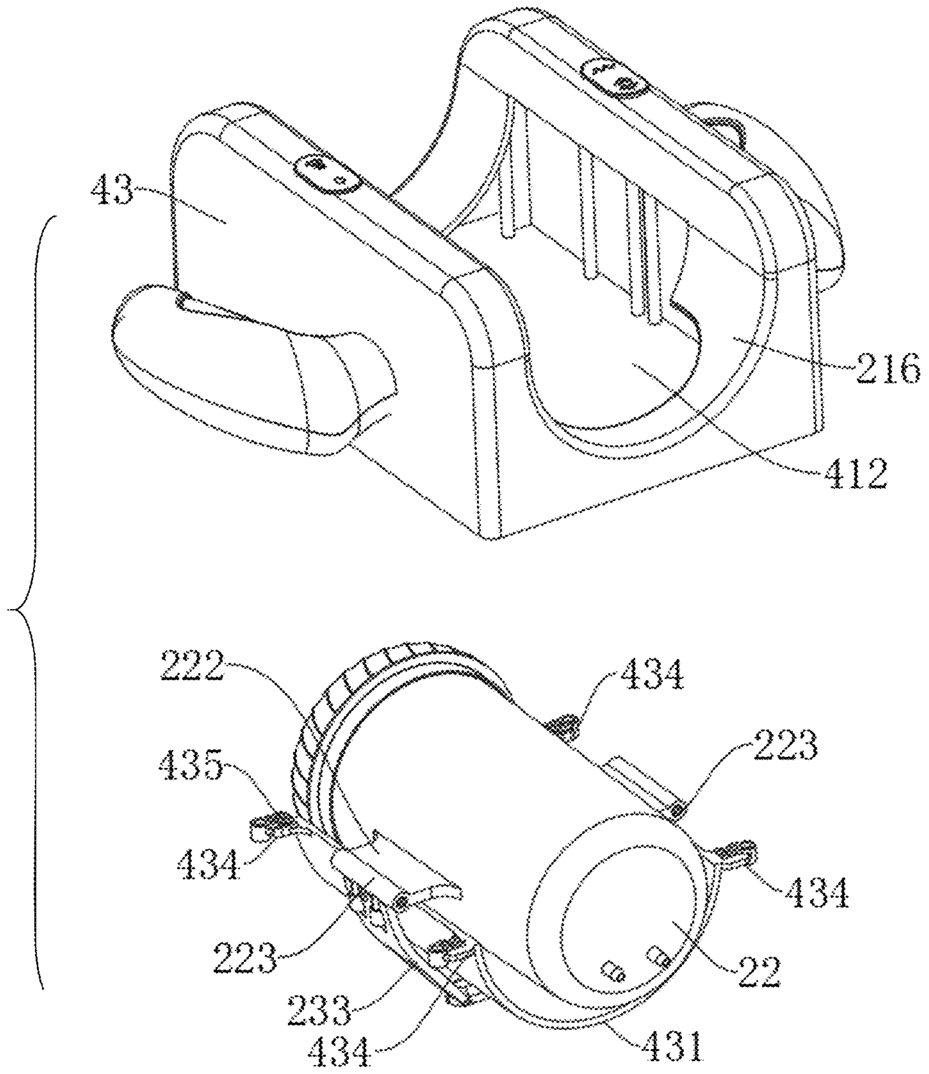
FIG. 16 is a partial structural exploded view of the second massager.
Figure 17:
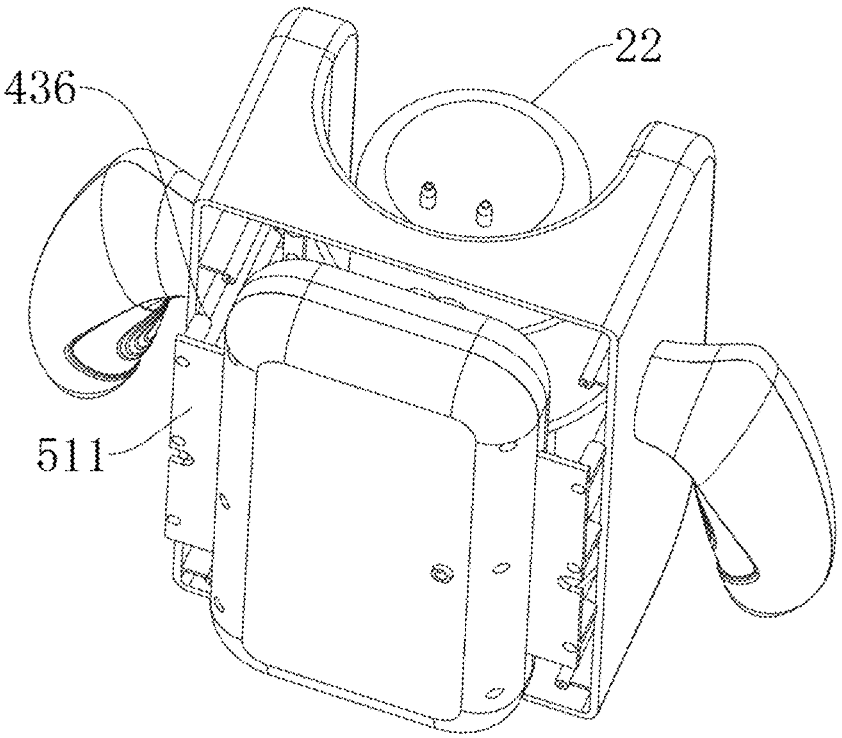
FIG. 17 is a first partial structural diagram of the second massager.
Figure 18:
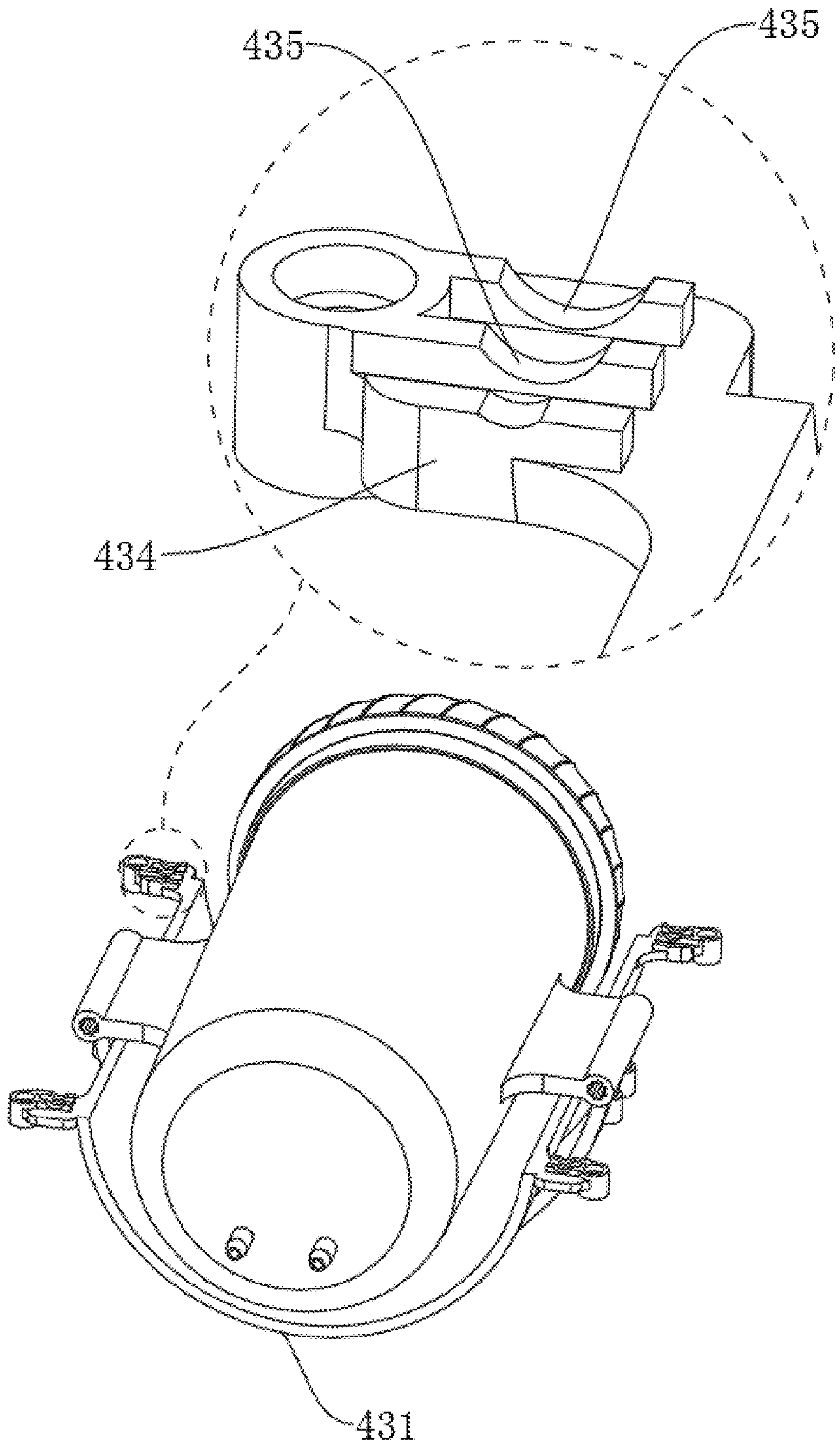
FIG. 18 is a first structural diagram of the second massager with a mounting portion and a reciprocating member integrated.
Figure 19:
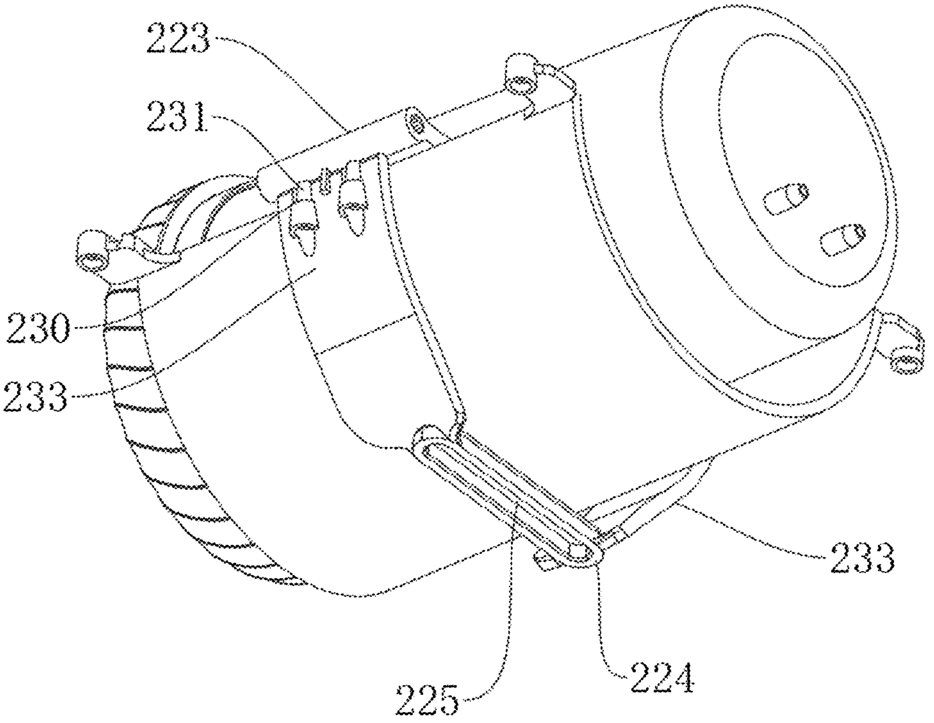
FIG. 19 is a second structural diagram of the second massager with the mounting portion and the reciprocating member integrated.
Figure 20:
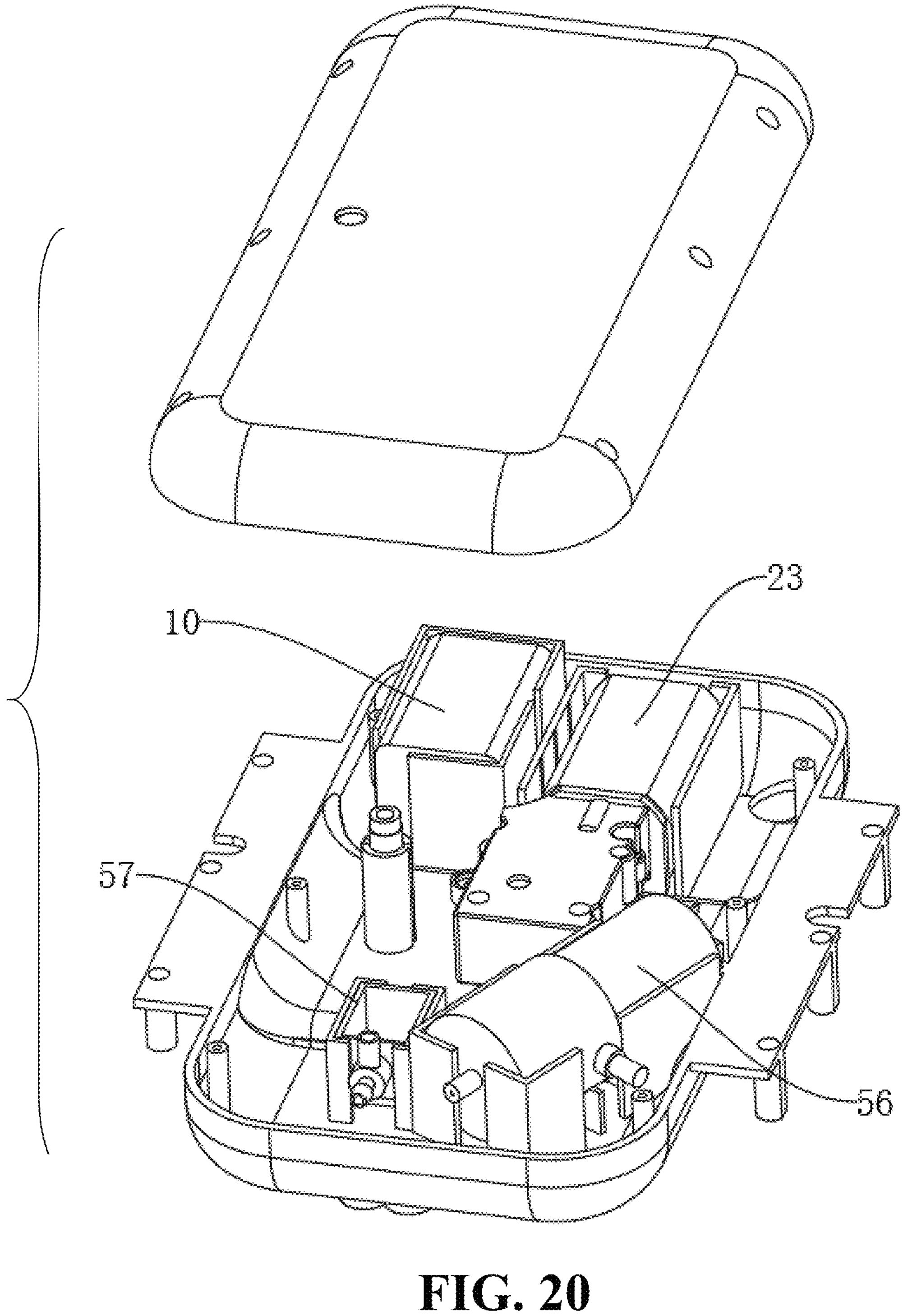
FIG. 20 is an exploded view of a reciprocating displacement drive assembly of the second massager.
Figure 21:
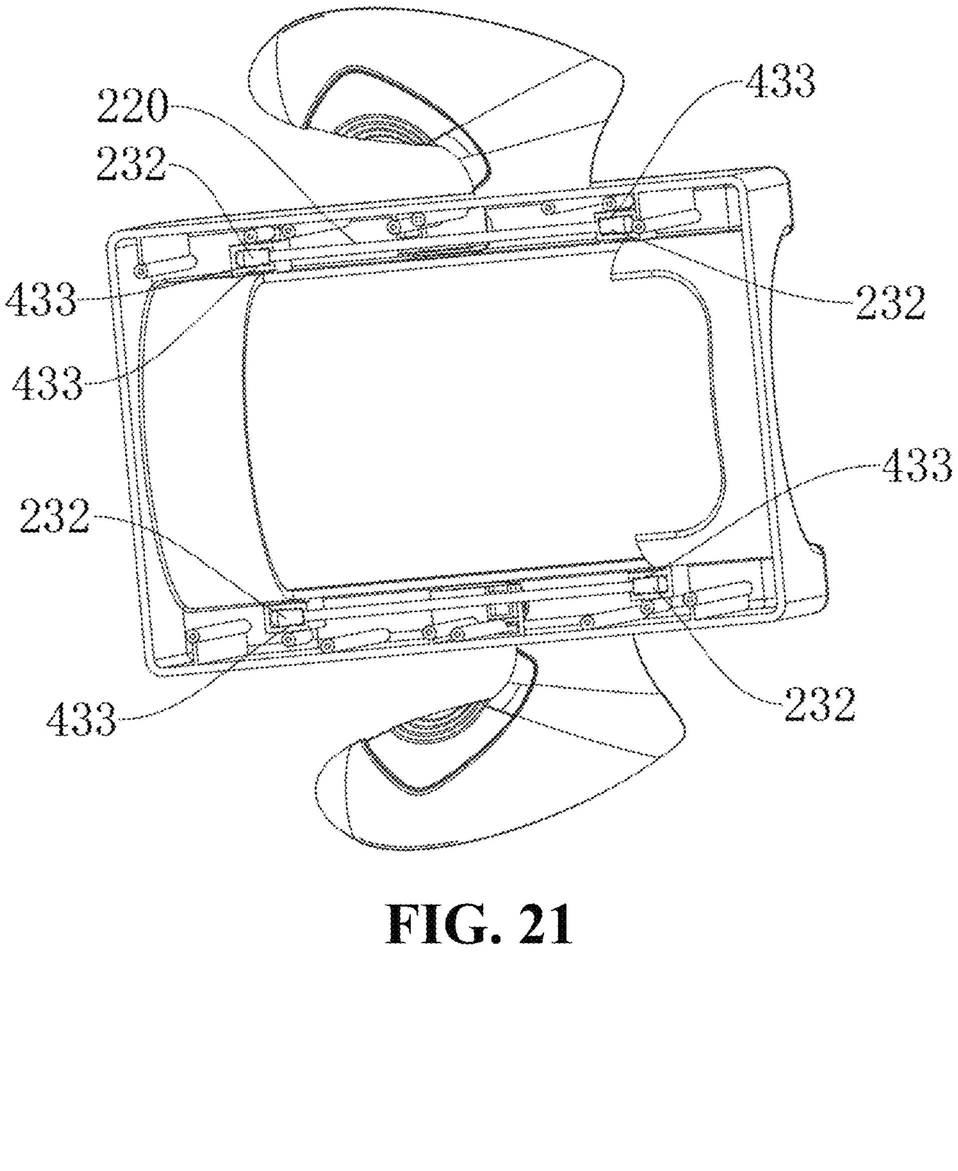
FIG. 21 is a second partial structural diagram of the second massager.
Figure 22:
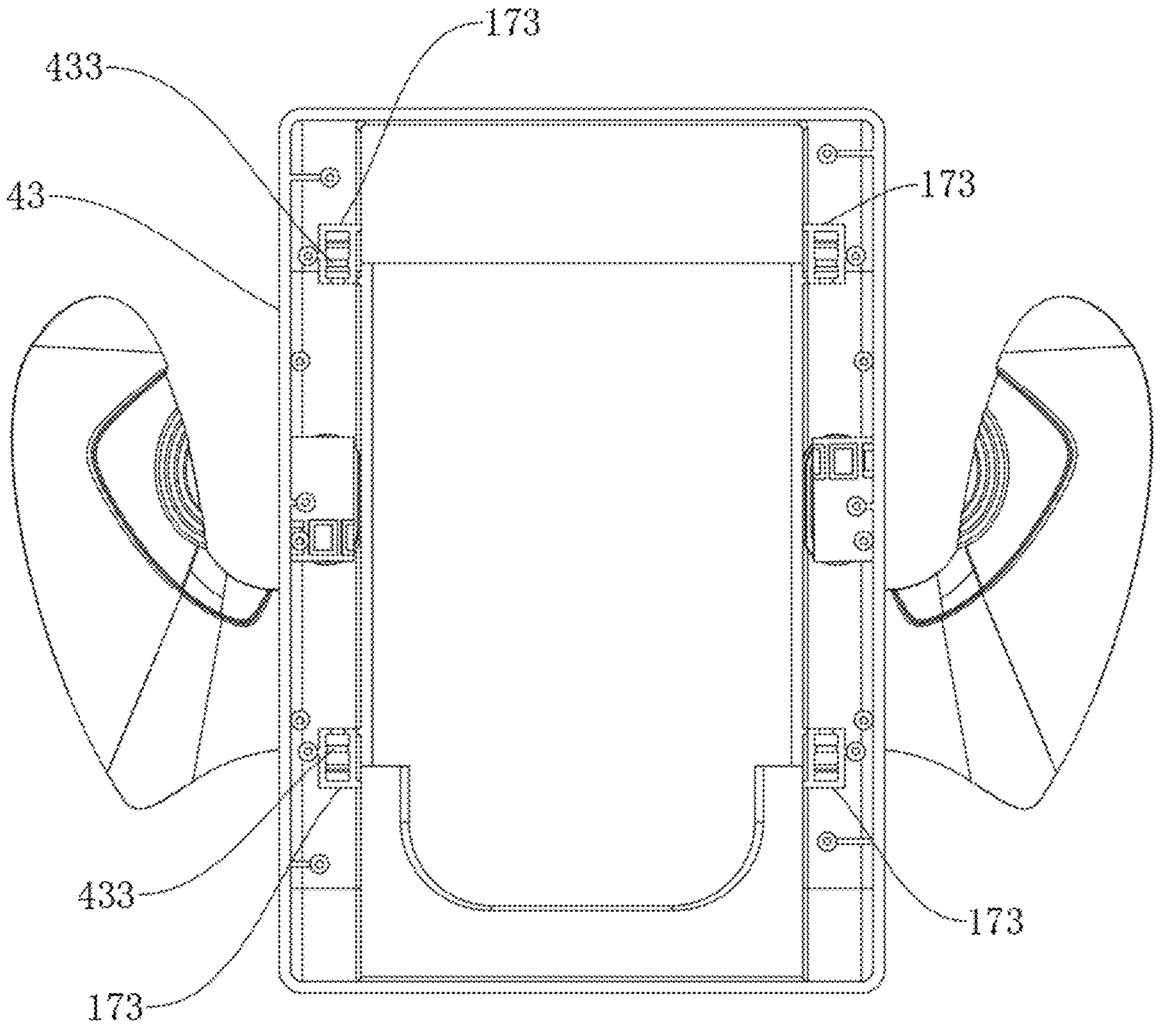
FIG. 22 is a third partial structural diagram of the second massager.
Figure 23:
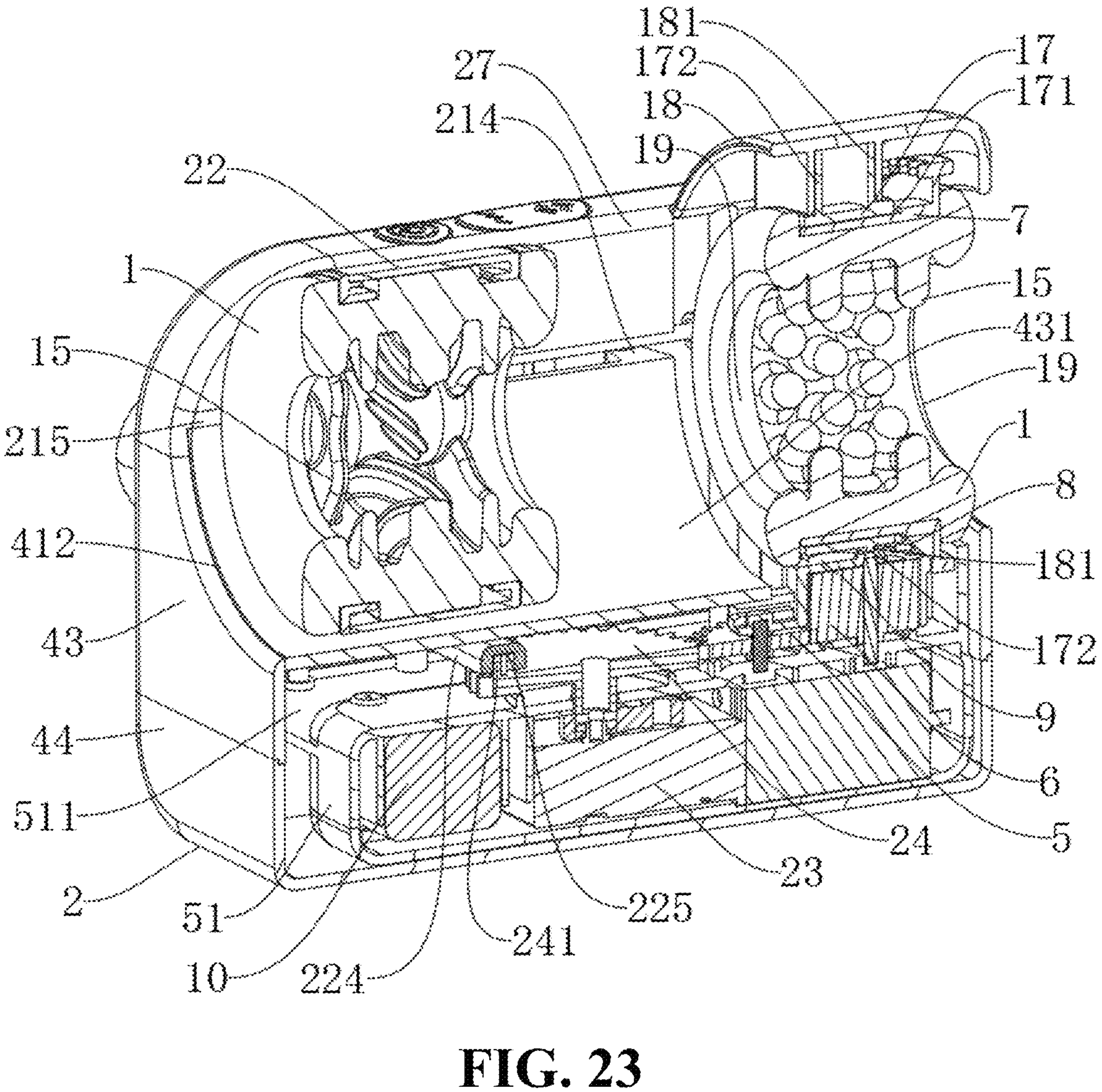
FIG. 23 is an overall structural diagram of a third massager.
Figure 24:
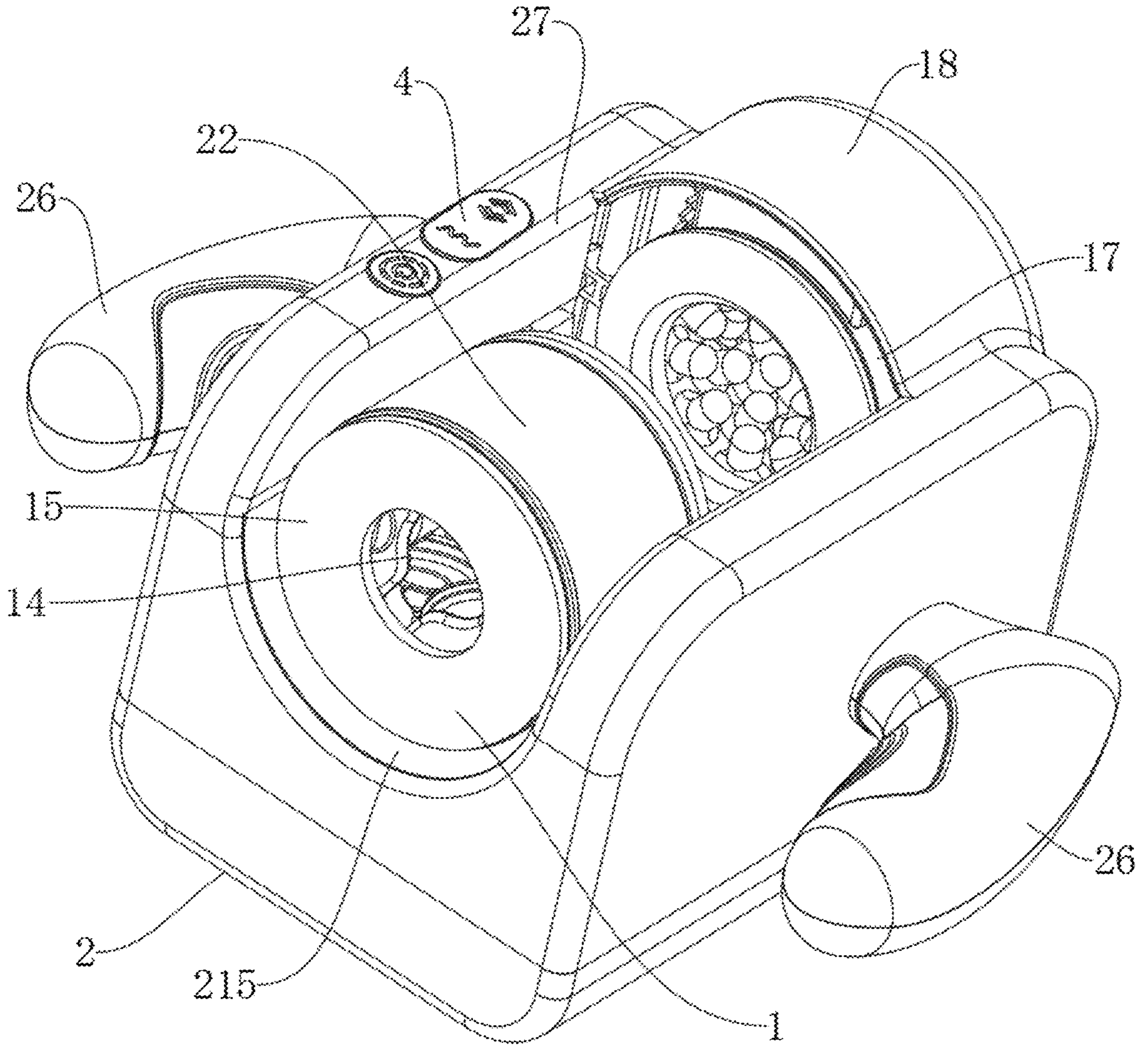
FIG. 24 is an overall structural cross-sectional diagram of the third massager.
Figure 25:
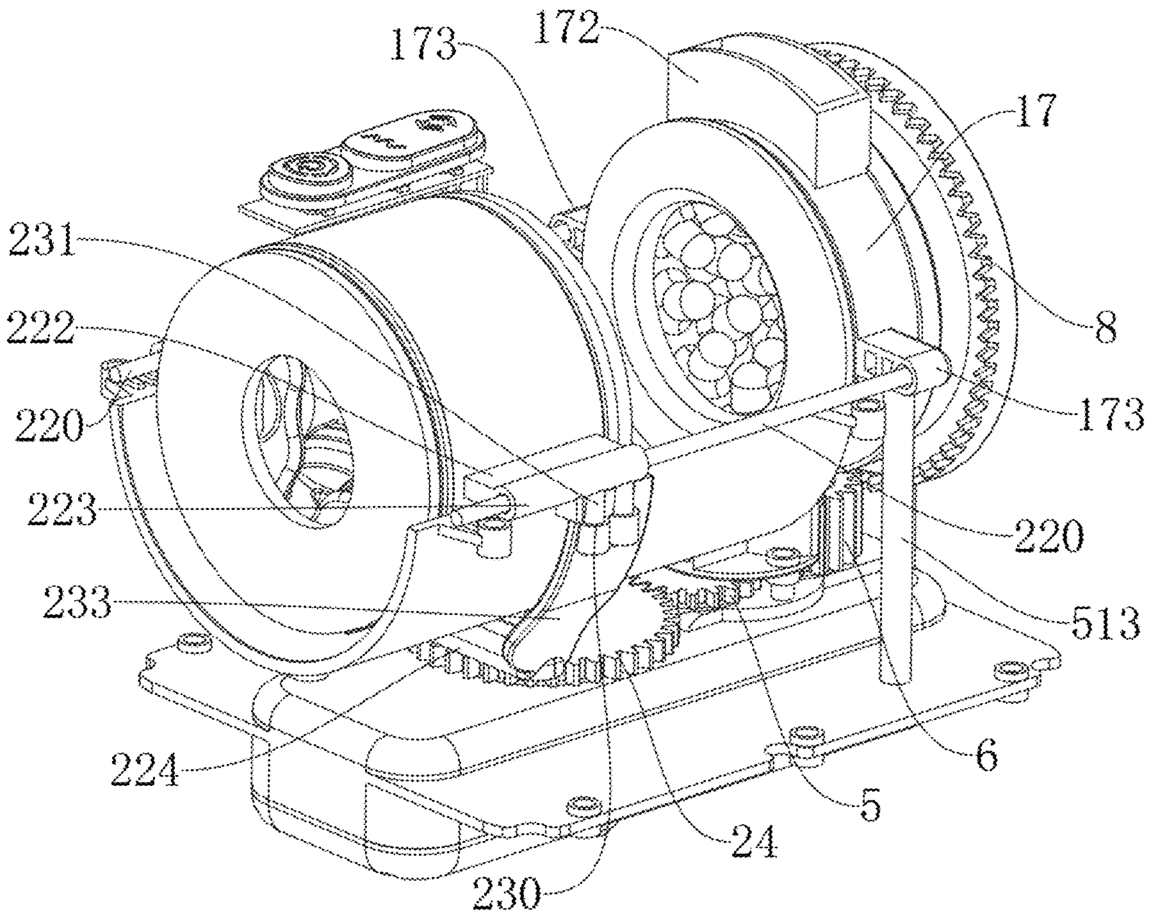
FIG. 25 is a structural diagram of a specific mechanism in an outer shell of the third massager.
Figure 26:
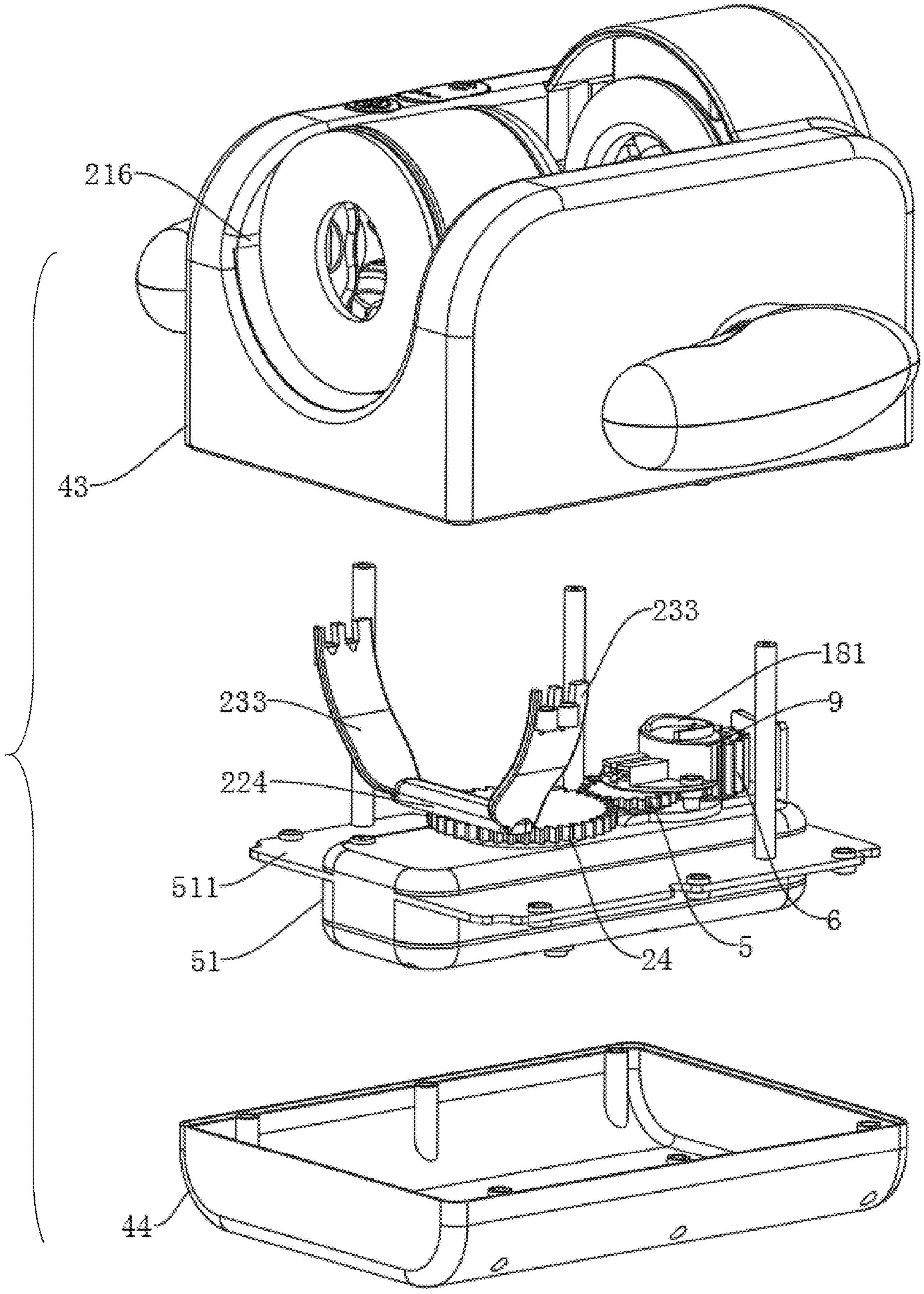
FIG. 26 is an overall structural exploded view of the third massager.
Figure 27:
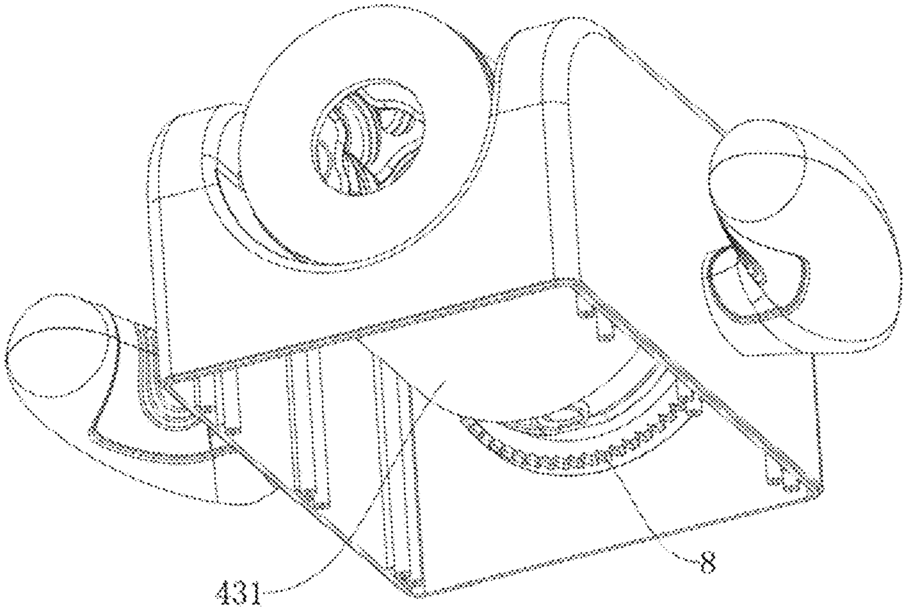
FIG. 27 is a schematic diagram of the third massager with annular meshing teeth passing through the outer shell.
Figure 28:
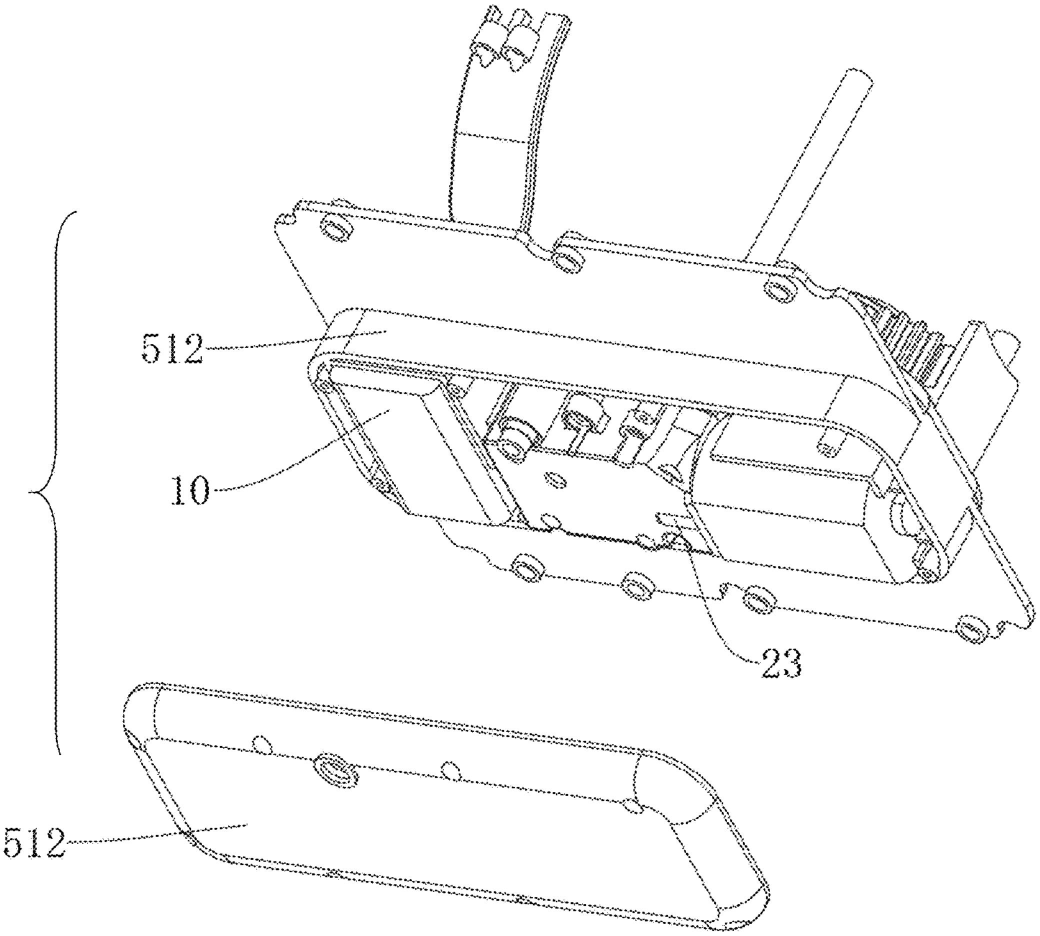
FIG. 28 is an exploded view of an inner shell portion of the third massager.
Figure 29:
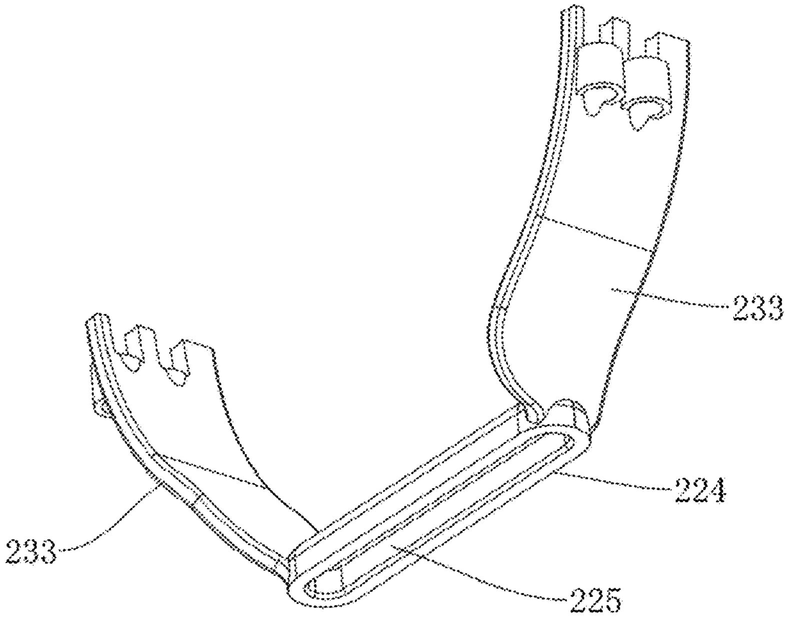
FIG. 29 is a partial structural diagram of a displacement member of the third massager.
Figure 30:
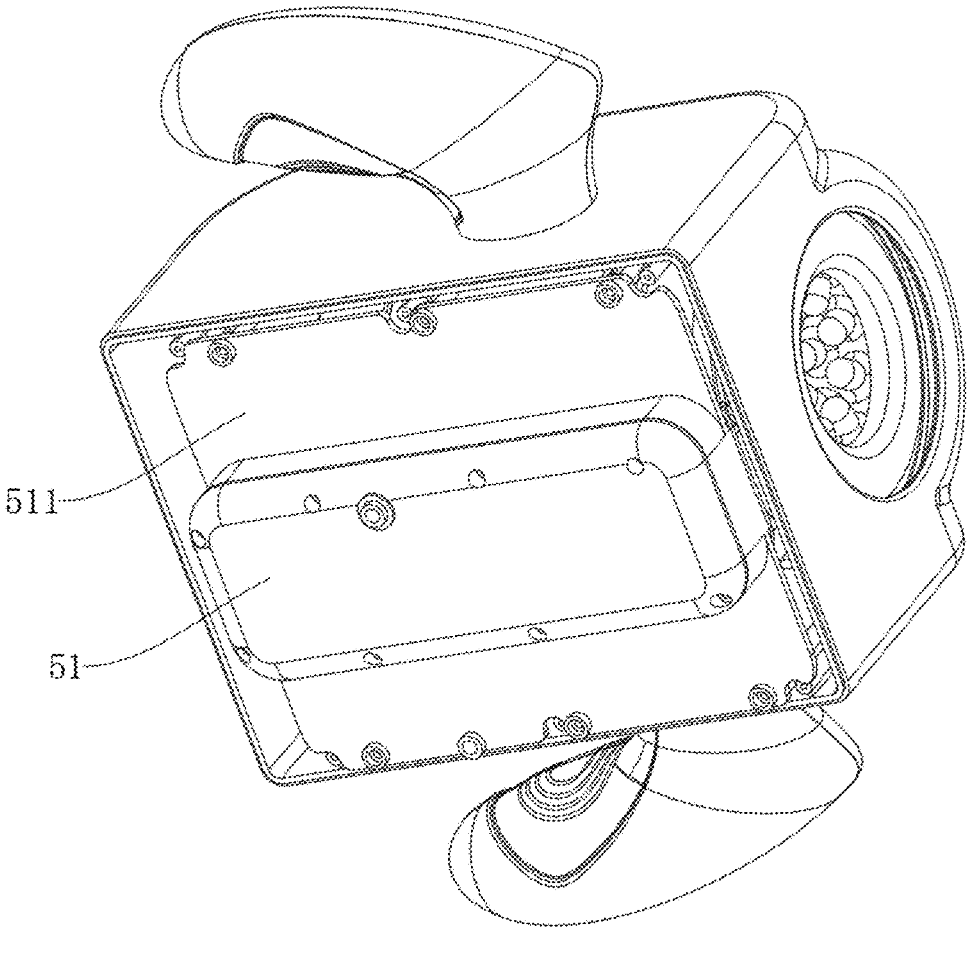
FIG. 30 is a structural diagram of the third massager with an inner shell and the outer shell integrated.
Figure 31:
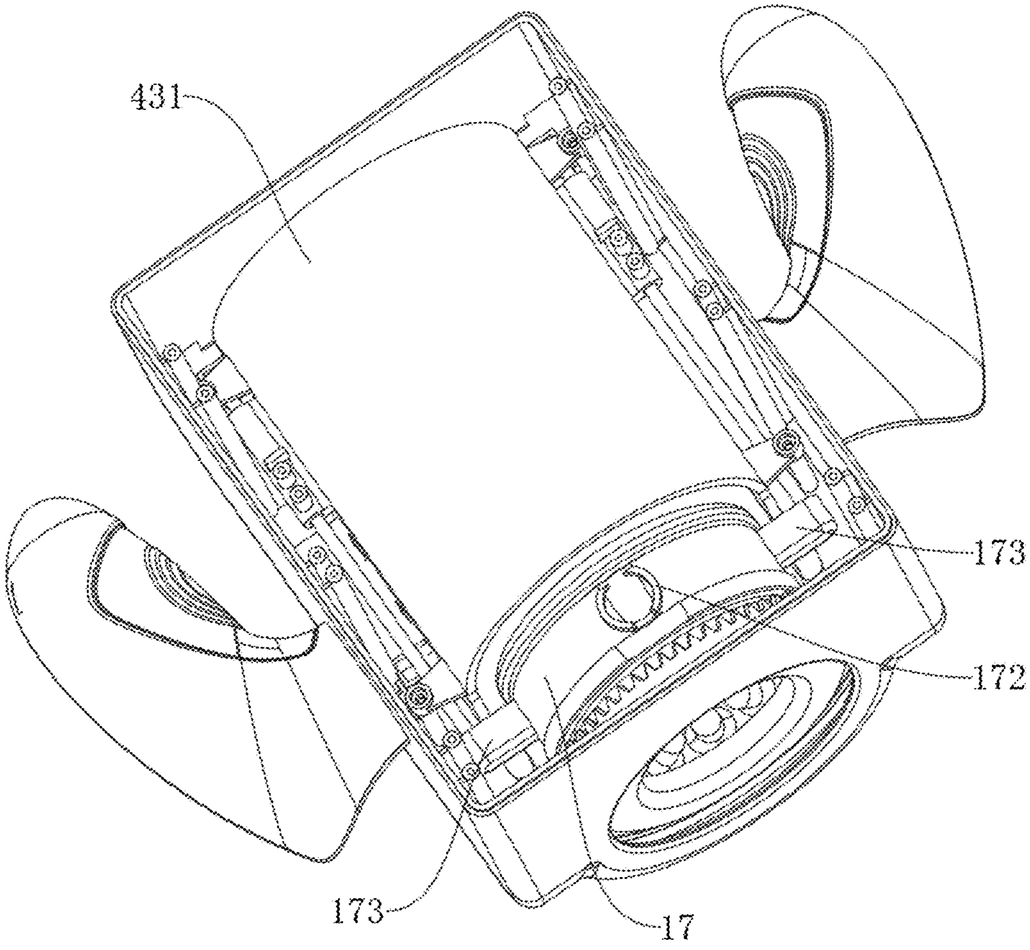
FIG. 31 is an internal structural diagram of an upper shell of the third massager.
Figure 32:
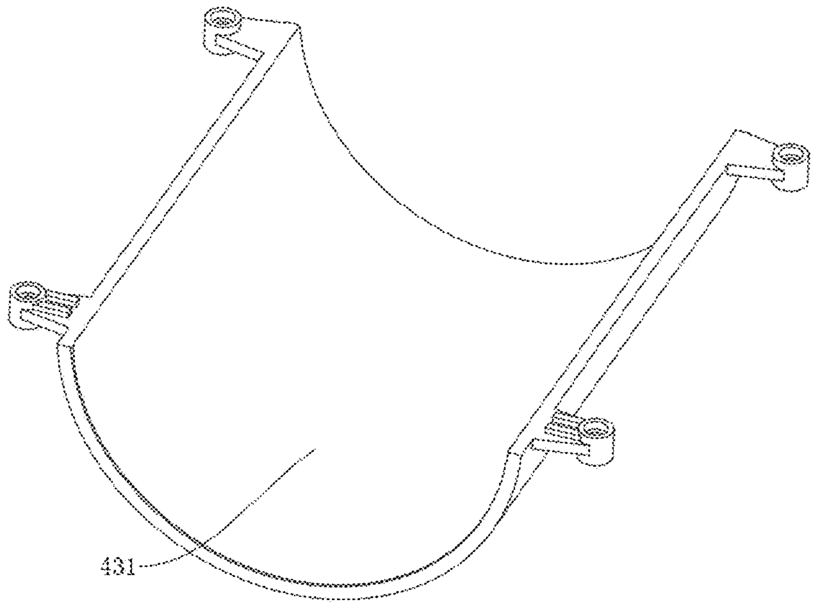
FIG. 32 is a structural diagram of a curved supplementing piece of the third massager.

As shown in FIGS. 1-32, the massager described in the present embodiment includes a massaging member 1, an outer shell 2 and a driver, the outer shell 2 includes an accommodating cavity, the driver is mounted in the accommodating cavity, the driver includes a reciprocating displacement drive assembly 21 and a mounting portion 22 located outside the outer shell 2 in a suspended state, a connecting portion 222 of the reciprocating displacement drive assembly 21 penetrates a long-shaped guide hole 214 on the outer shell 2 and is connected with the mounting portion 22, and the massaging member 1 is at least partially connected with the mounting portion 20) 22 in a plug-in manner, so that the reciprocating displacement drive assembly 21 drives the mounting portion 22 to perform a reciprocating linear displacement action along a first direction of the outer shell 2 to cause the massaging member 1 to perform a reciprocating telescopic motion. Specifically, the reciprocating displacement drive assembly 21 includes a motor 23, a rotating member 24 and a reciprocating displacement member 221, the reciprocating displacement member 221 is at least partially slidably connected with an inner wall of the accommodating cavity, a lower end of the reciprocating displacement member 221 penetrates the long-shaped guide hole 214 on the outer shell 2 and is then connected with the mounting portion 22, a long-shaped groove 225 provided along a second direction of the outer shell is formed at the lower end of the reciprocating displacement member 221, an eccentric shaft 241 is provided on the rotating member 24, the eccentric shaft 241 is located in the long-shaped groove 225, a rotating shaft of the motor 23 is connected with a central position of the rotating member 24, the first direction is a length direction of the outer shell 2, the second direction is a width direction of the outer shell 2, and the outer shell 2 is made of a plastic material.

Here, the motor 23 drives the rotating member 24 to rotate to cause the eccentric shaft 241 to perform a circular motion, in this case, the eccentric shaft 241 and the long-shaped groove 225 cooperate with each other to drive the reciprocating displacement member 221 to perform a long-stroke reciprocating displacement on a linear guide member 220 to drive the massaging member 1 to perform a long-stroke reciprocating motion, so that the massaging member 1 massages a part of the human body.

Preferably, the reciprocating displacement drive assembly 21 further includes at least one linear guide member 220 fixed in the accommodating cavity, the linear guide member 220 is penetratingly arranged in a guide hole of the reciprocating displacement member 221, and two linear guide members 220 may be arranged in order to stabilize sliding of the mounting portion 22, and the two linear guide members 220 are respectively located on opposite sides of the mounting portion 22, and the two linear guide members 220 are also parallel to each other and located on a same horizontal plane.

In the present embodiment, in order to make the structural design reasonable and the overall massager structure compact, a long-shaped recess 215 provided along the first direction of the outer shell 2 is formed on an outer side of the outer shell 2, the mounting portion 22 is at least partially arranged in the long-shaped recess 215, and long-shaped guide holes 214 are provided on an inner wall of the long-shaped recess 215 or a side wall of a second mouth portion 27 of the long-shaped recess thereof, where two long-shaped guide holes 214 may be arranged and are respectively located on opposite sides of the long-shaped recess 215.

Based on the above structure, three massage methods can be implemented, with one mode suitable for acupoint pressing massage or vagina massage, and the other two modes suitable for finger or penis massage. The three embodiments are specifically as follows.

FIGS. 1-9 show a massager described in a first embodiment and is suitable for acupoint pressing massage or vagina massage, and therefore the massaging member 1 is in a columnar structure, a mounting cavity 226 is provided on the mounting portion 22, the massaging member 1 includes a columnar shell 11 and a soft rubber layer 12 wrapped around an outer surface of the columnar shell 11, and one end of the columnar shell 11 is placed in the mounting cavity 226 to be fixed to each other, where the soft rubber layer 12 is generally made of silica gel to achieve comfortable contact with the skin of muscle parts or acupoints to be massaged or with the inner wall of the vagina, and a connecting sleeve 13 is tightly fixed or welded and fixed in the mounting cavity 226, and a slot 131 and a buckle 111 which are snap-fitted to each other are respectively provided on a peripheral side of one end of the columnar shell 11 and an inner wall of the connecting sleeve 13, which makes the massaging member 1 stable and reliable after mounting; and the columnar shell 11 is made of a plastic material.

Here, when the columnar massaging member 1 performs a reciprocating displacement motion along the first direction of the outer shell 2, an end portion of the massaging member 1 is in contact with a corresponding muscle part or acupoint to perform pressing massage, or the massaging member 1 is inserted into the vagina to perform massage.

Preferably, a vibration device 3 is mounted in the columnar shell 11, and the vibration device 3 is generally a vibration motor 23. When the vibration device 3 is started, vibration massage can be realized, and the vibration device 3 is fixed in a fixing groove in the columnar shell 11.

In the present embodiment, the telescopic driver further includes a motor casing 210, where the motor casing 210 is arranged on a side of the outer shell 2 corresponding to the rotating member 24, the motor 23 is placed in a cavity of the motor casing 210, the motor casing 210 and the outer shell 2 are integrated with each other into an integrated structure, or the motor casing 210 and the outer shell 2 can be connected together by bolting or welding.

Preferably, an opening 217 is provided on the outer shell 2 to allow a cavity in the outer shell 2 and the cavity in the motor casing 210 to communicate with each other, a cover plate 25 is fixed at the opening 217, the cover plate 25 abuts against an upper end of the motor 23, and the rotating shaft of the motor 23 penetrates the cover plate 25, and such a structure is suitable for the case that the motor casing 210 and the outer shell 2 are integrated with each other into an integrated structure, so that when the motor 23 is mounted, the motor 23 is placed in the cavity of the motor casing 210 through the opening 217, and then the cover plate 25 is fixed at the opening 217 by bolting, so that the motor 23 is fixedly mounted in the cavity in the motor casing 210, where the motor casing 210 is in a protruding state from an outer wall of the outer shell 2, so the motor casing can be used as a hand-held part for massage.

Further, an annular track groove 219 is provided on the outer shell 2 below the rotating member 24, a guide portion 243 is provided on the rotating member 24, the guide portion 243 is located in the annular track groove 219, and the rotating shaft of the motor 23 is located at a center of the annular track groove 219, where two convex rings spaced apart from each other are protruded on an inner wall of the outer shell 2, so that the annular track groove 219 is formed between the two convex rings.

In the present embodiment, the reciprocating displacement member 221 includes an actuating portion 224 and at least one sliding portion 223, the long-shaped groove 225 is arranged on a bottom surface of the actuating portion 224, the sliding portion 223 is in a sliding fit with the linear guide member 220, a connecting portion 222 of the sliding portion 223 passes through the long-shaped guide hole 214 of the outer shell 2 and is connected with the mounting portion 22, and the actuating portion 224 is connected with the at least one sliding portion 223; where two sliding portions 223 are arranged, and the two sliding portions 223 are respectively located on opposite sides of the mounting portion 22, and the two sliding portions 223 are located on a same horizontal plane.

Preferably, the linear guide member 220 is a long-shaped guide rod, the sliding portion 223 is a guide sleeve movably sleeved on the guide rod, the rotating member 24 is a rotating disc with a large outer diameter, a bearing 242 or a roller is mounted on the eccentric shaft 241, and an outer peripheral wall of the bearing 242 or the roller is provided in contact with an inner wall of the long-shaped groove 225.

Here, the outer shell 2 includes a lower shell 44 and an upper shell 43, the upper shell 43 includes a first shell 212 and a second shell 213 which are spliced together, at least one positioning groove 227 is respectively provided at both ends of the lower shell 44 a first direction, both ends of the linear guide member 220 are respectively placed in the positioning grooves 227 at both ends of the lower shell 44, the long-shaped guide hole 214 is arranged on the first shell 212, and a depression 216 is respectively provided on the first shell 212 and the second shell 213 at positions corresponding to each other; positioning columns 218 respectively corresponding to positions of the positioning grooves 227 are provided on inner walls of the first shell 212 and the second shell 213; after the first shell 212 and the second shell 213 are respectively spliced and fixed with the lower shell 44 by bolts, the positioning columns 218 abut against end portions of the linear guide members 220 in the positioning grooves 227, and the two depressions 216 are spliced together to form a long-shaped recess 215; and the number of the linear guide members 220, the sliding portions 223, the guide portions 243 and the long-shaped guide holes 214 are all two; and the number of the positioning grooves 227 at each end of the lower shell 44 is also two. Here, one end of the long-shaped guide hole 214 on the first shell 212 forms a mouth portion, and when the first shell 212 is fixed on the lower shell 44, the connecting portion 222 can enter the long-shaped guide hole 214 through the mouth portion at one end of the long-shaped guide hole 214.

Preferably, the two depressions 216 are arc-shaped depressions 216, so that the inner wall of the long-shaped recess 215 is a circular arc-shaped structure, and the mounting portion 22 is preferably a cylindrical structure.

FIGS. 10-22 show a massager described in a second embodiment and is suitable for finger or penis massage, and therefore the massaging member 1 is a flexible massage sleeve, a mounting cavity 226 is provided on the mounting portion 22, the flexible massage sleeve is mounted in the mounting cavity 226, a massage cavity 14 is provided on the flexible massage sleeve, and the flexible massage sleeve is made of silica gel, and therefore the mounting portion 22 and the flexible massage sleeve simultaneously perform friction massage on fingers or a penis placed in the massage cavity 14 when performing the reciprocating displacement motion along the first direction of the outer shell 2, and an inner wall of the massage cavity 14 wraps the fingers or the penis during the massage.

In the present embodiment, the reciprocating displacement member 221 includes an actuating portion 224 and at least one sliding portion 223, the long-shaped groove 225 is arranged on a bottom surface of the actuating portion 224, the sliding portion 223 is in a sliding fit with the linear guide member 220, a connecting portion 222 of the sliding portion 223 passes through the long-shaped guide hole 214 of the outer shell 2 and is connected with the mounting portion 22, and the at least one sliding portion 223 is connected with the actuating portion 224 by a connecting piece 233; where two sliding portions 223 are arranged, and the two sliding portions 223 are respectively located on opposite sides of the mounting portion 22, and the two sliding portions 223 are located on a same horizontal plane; and the actuating portion 224 and the two connecting pieces 233 are integrated with each other into an integrated structure, the sliding portion 223 and the connecting pieces 233 are fixed to each other by a connection manner in which an insertion shaft 231 is fitted into a slot 230, and the two sliding portions 223 and the mounting portion 22 are integrated with each other into an integrated structure, and each sliding portion 223 is a sliding sleeve sleeved on the linear guide member 220.

In the present embodiment, a suction pump 56 and a solenoid valve 57 are also provided in the accommodating cavity, an air inlet 228 and an air outlet 229 in communication with an inner cavity of the mounting portion 22 are provided on the mounting portion 22, a suction port of the suction pump 56 is connected with the air outlet 229 by a pipeline, one port of the solenoid valve 57 is connected with the air inlet 228 by a pipeline, an outer wall of an end portion of the flexible 20) massaging member 1 is in close contact with an inner wall of an inner cavity port of the mounting portion 22, and an end step 16 thereof is in close contact with an edge of the inner cavity port of the mounting portion 22, thereby achieving a sealing fit between the end portion of the flexible massaging member 1 and the inner cavity port of the mounting portion 22. Here, the suction pump 56 operates and the solenoid valve 57 is closed, so that a negative pressure is formed in the inner cavity of the mounting portion 22 to press the flexible massaging member 1 to decrease a volume of the massage cavity 14, and then a cavity wall of the massage cavity 14 and flexible protrusions 15 are used to press and massage fingers or the penis; and after pressing for a period of time, the suction pump 56 stops operation, and the solenoid valve 57 is turned on to increase the volume of the massage cavity 14, which release the fingers or the penis from pressing, and then negative pressure massage is performed on the fingers by continuous pressing and relaxation.

In the present embodiment, a fixing portion 173 is respectively provided at both ends of the outer shell 2 having the linear guide members 220, at least one first tapered groove 433 is provided on each of the fixing portions 173, both ends of the linear guide member 220 are respectively provided with a tapered head 232 adapted to each of the first tapered grooves 433, both the first tapered groove 433 and the tapered head 232 are tapered structures with an inner end diameter smaller than an outer end diameter, the tapered head 232 is placed in a columnar groove, a pressing piece 434 is pressed on each of the tapered heads 232, the pressing pieces 434 are fixed to an column body on the inner wall of the outer shell 2 or an edge of the first tapered groove 433 by bolts, where two first tapered grooves 433 are generally arranged at each location, the two first tapered grooves 433 are respectively adapted to middle and outer end tapered structures of the tapered head 232, and an end portion of the linear guide member 220 close to the tapered head 232 is positioned in a groove body of the fixing portion 173. Such a structure makes it convenient to fixedly mount the linear guide member 220 in the outer shell 2 stably and reliably.

Preferably, at least one second tapered groove 435 having a same shape as the first tapered groove 433 is provided on an inner side of each of the pressing pieces 434, and the tapered head 232 is fitted into the first tapered groove 433 and the second tapered groove 435. Such a structure allows the tapered heads 232 to be firmly positioned and fixed, and two or three second tapered grooves 435 may be arranged on each pressing piece.

In the present embodiment, a notch 412 is provided on the long-shaped recess 215, a curved supplementing piece 431 is mounted at the notch 412, and one end edge of the curved supplementing piece 431 and one end edge of the notch 412 form a through opening. Specifically, the outer shell 2 includes an upper shell 43 and a curved supplementing piece 431, one side of the upper shell 43 is a sliding side of the massaging member 1, the sliding side of the massaging member 1 is formed with a depression 216 and a notch 412 located in the depression 216 and 20) adapted to the curved supplementing piece 431, the curved supplementing piece 431 is mounted at the notch 412, and each pressing piece 434 is interconnected with the curved supplementing piece 431; a long-shaped guide hole 214 is formed between opposite sides of the curved supplementing piece 431 and opposite sides of the notch 412 respectively, so that connecting portions 222 of the two sliding portions 223 respectively pass through the corresponding long-shaped guide holes 214 and are connected with the mounting portion 22; the depression 216 is an arc-shaped depression 216, and the curved supplementing piece 431 is curved in an arc shape, so that a cross section of the long-shaped recess on the upper shell 43 is in an arc-shaped structure, and the two connecting pieces 233 on the sliding portions 223 are respectively located on the opposite sides of the curved supplementing piece 431; and since the sliding portions 223 and the mounting portion 22 are integrated with each other into an integrated structure by the connecting portions 222, the notch 412 facilitates the mounting of the mounting portion 22 and the sliding portion 223, thus after the mounting portion 22 is placed in the long-shaped recess, the connecting portion 222 of the sliding portion 223 can be placed in the upper shell 43 through the notch 412.

In the present embodiment, the reciprocating displacement drive assembly 21 further includes an inner shell 51; the motor 23, the suction pump 56 and the solenoid valve 57 are all mounted in the inner shell 51, and the rotating member 24 is suspended outside the inner shell 51; and the inner shell 51 and an inner wall of the outer shell 2 are connected with each other by a connecting column 436, and a connecting plate 511 on the inner shell 51 and the connecting column 436 on the inner wall of the outer shell 2 are fixed by bolts. Here, the inner shell 51 is composed of two half shells 512 which are spliced and fixed together.

In the present embodiment, the outer shell 2 further includes a lower shell 44 and a grip handle 26; the lower shell 44 covers the inner shell 51 and is fixed together with the upper shell 43, two grip handles 26 are arranged, a connecting portion 222 of the grip handle 26 is provided on the upper shell 43 or the lower shell 44, and the control key 4 is provided on the upper shell 43 or the grip handle 26, where the grip handle 26 is at least partially integrated with the upper shell 43 or the lower shell 44 into an integrated structure, or they are can also be connected by welding or bolting, and the grip handle 26, the upper shell 43, the lower shell 44, the mounting portion 22 and the inner shell 51 are generally made of a plastic material.

Finally, a control board is also provided in the inner shell 51 or the outer shell 2, a control chip is provided on the control board, a program for controlling operation of the suction pump 56, the motor 23 and the solenoid valve 57 is entered in the control chip, and the control key 4, the suction pump 56, the motor 23 and the solenoid valve 57 are respectively connected with and controlled by the control chip; and a pipeline connecting the suction pump 56 with the air outlet 229 and a pipeline connecting the solenoid valve 57 with the air inlet 228 penetrate the inner shell 51.

FIGS. 23-32 show a massager described in a third embodiment and is suitable for finger or penis massage; the mounting portion 22 is a cylinder, both ports of the cylinder are communicated with each other through a mounting cavity 226, the massaging member 1 is a flexible massage cylinder, both ends of the flexible massage cylinder form a first mouth portion 19 in communication with the massage cavity 14 therein, and the flexible massage sleeve is made of silica gel; therefore, when the mounting portion 22 and the flexible massage cylinder simultaneously perform a reciprocating displacement motion along the first direction of the outer shell 2, friction massage is performed on fingers or a penis placed in the massage cavity 14; and an inner wall of the massage cavity 14 partially wraps the fingers or the penis during the massage.

In the present embodiment, the massager further includes a mounting cylinder 7 provided coaxially with a mounting portion 22; and the mounting cylinder 7 and the mounting portion 22 are both located at an outer side of the outer shell 2 in a suspended state, the mounting cylinder 7 and the mounting portion 22 are spaced apart along the first direction of the outer shell 2, a flexible massage cylinder is mounted in the mounting cylinder 7, and the driver further includes a rotation drive assembly for driving the mounting cylinder 7 to rotate. Specifically, the rotation drive assembly includes a first gear 5 and a second gear 6, the first gear 5 and the second gear 6 mesh with each other, the rotating member 24 is a drive gear meshing with the first gear 5, and annular meshing teeth 8 on the mounting portion 22 at least partially pass through the outer shell 2 and mesh with the second gear 6, where the motor 23 drives the drive gear to rotate to drive the eccentric shaft 241 to perform a circular motion, so that the reciprocating displacement member 221 performs a telescopic reciprocating motion under the guide action of the long-shaped groove 225, and at the same time, the drive gear, the first gear 5, the second gear 6 and the annular meshing teeth 8 mesh with each other to drive the mounting portion 22 to rotate, thereby achieving telescopic and rotary motions of the mounting portion 22 and the mounting cylinder 7 respectively to massage the fingers or the penis in the flexible massage cylinder placed on the mounting portion 22 and the flexible massage cylinder placed on the mounting cylinder 7, thereby realizing reciprocating friction massage and rotary friction massage.

Preferably, in order to achieve a compact structure, the mounting cylinder 7 is also at least partially arranged in the long-shaped recess 215.

Preferably, both the mounting portion 22 and the mounting cylinder 7 are annular structures made of a plastic material, flexible convex portions are provided on an inner wall of each of the flexible massage cylinders, the flexible convex portions closely fit the fingers or an outer wall of the penis during massage, the mounting portion 22 is connected with a connecting portion 222 of the reciprocating displacement member 221, and an outer wall of each of the flexible massage cylinders is respectively fixed to the mounting portion 22 and an inner wall of the mounting cylinder 7 by concave-convex fit; and the drive gear, the first gear 5 and the second gear 6 are made of a plastic material or a metal material.

In the present embodiment, the reciprocating displacement member 221 includes an actuating portion 224 and two sliding portions 223, the two sliding portions 223 are respectively located on opposite sides of the mounting cylinder 7, and each of the sliding portions 223 is connected with the actuating portion 224 by a connecting piece 233, the long-shaped groove 225 is arranged on a bottom surface of the actuating portion 224, each of the sliding portions 223 is respectively in sliding fit with two linear guide members 220, and the connecting portion 222 of each of the sliding portions 223 respectively passes through a long-shaped guide hole 214 on an outer side of the outer shell 2 and is connected with the mounting portion 22. Here, the actuating portion 224 and the two connecting pieces 233 are integrated with each other into an integrated structure, the sliding portion 223 is fixed to the connecting pieces 233 by a connection manner in which an insertion shaft 231 is fitted into a slot 230, the two sliding portions 223 and the mounting portion 22 are integrated with each other into an integrated structure, and the sliding portion 223 is a sliding sleeve sleeved on the linear guide member 220.

In the present embodiment, the reciprocating displacement drive assembly 21 further includes an inner shell 51 fixed in the outer shell 2, the drive gear, the first gear 5 and the second gear 6 are all located on an outer side of the inner shell 51, the motor 23 is arranged in an inner cavity of the inner shell 51, and a rotating shaft thereof penetrates the inner shell 51 and is connected with the drive gear, the first gear 5 and the second gear 6 are respectively rotatably mounted on an outer side of the inner shell 51 by the rotating shaft, and a bracket 9 partially located above the first gear 5 and the second gear 6 is fixedly mounted on an outer side of the inner shell 51, and an upper end of the rotating shaft on the first gear 5 and the second gear 6 is rotatably connected to the bracket 9. Such a structure enables the first gear 5 and the second gear 6 to be reliable after mounting.

Preferably, a battery 10 is mounted in a battery compartment in the inner shell 51, the battery 10 supplies power to the motor 23, and the inner shell 51 is composed of two half shells 512 which are fixed together, a connecting plate 511 is provided on an outer wall of one half shell 512, the connecting plate 511 is fixed to the inner wall of the outer shell 2 by bolting, and the two half shells 512 are also made of a plastic material.

In the present embodiment, a positioning ring 17 is sheathed on an outer periphery of the mounting cylinder 7, a baffle 18 is provided above the mounting cylinder 7, and the baffle 18 is connected to the outer shell 2; a first plug-in portion 172 is respectively provided on opposite sides of the positioning ring 17, a second plug-in portion 181 is respectively provided on the bracket 9 and the baffle 18; the first plug-in portion 172 and the second plug-in portion 181 are plugged into and mesh with each other; the first plug-in portion 172 is a plug-in column, and the second plug-in portion 181 is a plug-in sleeve, or the first plug-in portion 172 is a plug-in sleeve, and the second plug-in portion 181 is a plug-in column, and the plug-in column is plugged into the plug-in sleeve; where the mounting cylinder 7 is rotatably positioned in the positioning ring 17, so that the mounting cylinder 7 can rotate stably, further improving reliability of rotary massage.

Further, opposite sides of the positioning ring 17 are respectively provided with a fixing portion 173, a support column 513 for supporting each fixing portion 173 is respectively provided on the inner shell 51 or on the inner wall of the outer shell 2, and both ends of the linear guide member 220 are respectively plugged into an plug-in groove on the inner wall of the outer shell 2 and an plug-in groove of the fixing portion 173. Such a structure enables the positioning ring 17 to be supported and positioned, and the linear guide member 220 to be assembled and fixed, so that the positioning ring 17 and the linear guide member 220 are stably mounted.

Preferably, an annular groove 171 and annular meshing teeth 8 are provided on the outer periphery of the mounting cylinder 7, and the positioning ring 17 is located in the annular groove 171. Here, the arrangement of the annular groove 171 further stabilizes rotation of the mounting cylinder 7 in the positioning ring 17.

In the present embodiment, a notch 412 is provided on the long-shaped recess 215, a curved supplementing piece 431 is mounted at the notch 412, and one end edge of the curved supplementing piece 431 and one end edge of the notch 412 form a through opening. Specifically, the outer shell 2 includes an upper shell 43, a lower shell 44 and a curved supplementing piece 431, one side of the upper shell 43 is a sliding side of the massaging member 1, the sliding side of the massaging member 1 is formed with a depression 216 and a notch 412 located in the depression 216 and adapted to the curved supplementing piece 431, the curved supplementing piece 431 is mounted at the notch 412, where the annular meshing teeth 8 pass through the notch 412 and mesh with the second gear 6, and the curved supplementing piece 431 is connected with the upper shell 43 or the lower outer shell 44 by bolts, a long-shaped guide hole 214 is formed between the opposite sides of the curved supplementing piece 431 and the opposite sides of the notch 412, so that each connecting portion 222 of the reciprocating displacement member 221 passes through the corresponding long-shaped hole and is connected with the mounting portion 22, and the upper case 43 and the lower case 44 are made of a plastic material.

The lower shell 44 covers the inner shell 51 and is fixed together with the upper shell 43, a transverse portion of the grip handle 26 is connected to the upper shell 43 or the lower shell 44, the grip handle 26 and the upper shell 43 or the lower shell 44 are an integrated structure, or the grip handle 26 is fixed to the upper shell 43 or the lower shell 44 by fasteners.

Finally, a control key 4 is provided on the upper shell 43 or the grip handle 26, a control board is also provided in the inner shell 51 or the outer shell 2, a control chip is provided on the control board, a program for controlling operation of the motor 23 is entered in the control chip, and the control key 4 and the motor 23 are respectively connected with and controlled by the control chip.

What is claimed is:

1. A massager, comprising:

a massaging member;

an outer shell comprising an accommodating cavity; and a driver mounted in the accommodating cavity, the driver comprising a reciprocating displacement drive assembly and a mounting portion located outside the outer shell in a suspended state, a connecting portion of the reciprocating displacement drive assembly penetrating a long-shaped guide hole on the outer shell and being connected with the mounting portion, and the massaging member being at least partially connected with the mounting portion in a plug-in manner, so that the reciprocating displacement drive assembly driving the mounting portion to perform a reciprocating linear displacement action along a first direction of the outer shell to cause the massaging member to perform a reciprocating telescopic motion; and the reciprocating displacement drive assembly comprises a motor, a rotating member and a reciprocating displacement member, the reciprocating displacement member is at least partially slidably connected with an inner wall of the accommodating cavity, a lower end of the reciprocating displacement member penetrates the long-shaped guide hole on the outer shell and is connected with the mounting portion, a long-shaped groove provided along a second direction of the outer shell is formed at the lower end of the reciprocating displacement member, an eccentric shaft is provided on the rotating member, the eccentric shaft is located in the long-shaped groove, and a rotating shaft of the motor is connected with a central position of the rotating member.

2. The massager according to claim 1, wherein the massaging member is in a columnar structure, a mounting cavity is provided on the mounting portion, the massaging member comprises a columnar shell and a soft rubber layer wrapped around an outer surface of the columnar shell, and one end of the columnar shell is placed in the mounting cavity to be fixed to each other.

3. The massager according to claim 2, wherein the mounting cavity is fixedly provided with a connecting sleeve, and a slot and a buckle which are snap-fitted to each other are respectively provided on a peripheral side of one end of the columnar shell and an inner wall of the connecting sleeve.

4. The massager according to claim 2, wherein a vibration device is mounted in the columnar shell.

5. The massager according to claim 1, wherein the driver further comprises a motor casing, the motor casing is arranged on a side of the outer shell corresponding to the rotating member, and the motor is arranged in a cavity of the motor casing.

6. The massager according to claim 5, wherein an opening is provided on the outer shell to allow a cavity in the outer shell and the cavity in the motor casing to communicate with each other, a cover plate is fixed at the opening, the cover plate abuts against an upper end of the motor, and the rotating shaft of the motor penetrates the cover plate.

7. The massager according to claim 1, wherein the massaging member is a flexible massage sleeve, a mounting cavity is provided on the mounting portion, the flexible massage sleeve is mounted in the mounting cavity, and a massage cavity is provided on the flexible massage sleeve.

8. The massager according to claim 7, wherein a suction pump and a solenoid valve are also provided in the accommodating cavity, an air inlet and an air outlet in communication with an inner cavity of the mounting portion are provided on the mounting portion, a suction port of the suction pump is connected with the air outlet by a pipeline, one port of the solenoid valve is connected with the air inlet by a pipeline, and a seal is provided between an end portion of the massaging member and a port of the mounting cavity.

9. The massager according to claim 7, wherein the reciprocating displacement drive assembly further comprises an inner shell fixed in the outer shell, the motor and the suction pump are both arranged in an inner cavity of the inner shell, and the rotating shaft of the motor penetrates the inner shell and is connected with the rotating member.

10. The massager according to claim 1, wherein the mounting portion is a cylinder, both ports of the cylinder are communicated with each other through the mounting cavity, the massaging member is a flexible massage cylinder, and both ends of the flexible massage cylinder form a first mouth portion in communication with the massage cavity therein.

11. The massager according to claim 10, further comprising a mounting cylinder arranged coaxially with the mounting portion, wherein the mounting cylinder and the mounting portion are spaced apart along the first direction of the outer shell, the flexible massage cylinder is mounted in the mounting cylinder, and the driver further comprises a rotation drive assembly for driving the mounting cylinder to rotate.

12. The massager according to claim 11, wherein the rotation drive assembly comprises a first gear and a second gear, the first gear and the second gear mesh with each other, the rotating member is a drive gear meshing with the first gear, and annular meshing teeth on the mounting portion at least partially pass through the outer shell to mesh with the second gear.

13. The massager according to claim 12, wherein the reciprocating displacement drive assembly further comprises an inner shell fixed in the outer shell, the drive gear and the second gear are both located on an outer side of the inner shell, the motor is arranged in an inner cavity of the inner shell, and the rotating shaft of the motor penetrates the inner shell and is connected with the drive gear, and the drive gear and the second gear are respectively rotatably mounted on an outer side of the inner shell by the rotating shaft.

14. The massager according to claim 13, wherein a bracket partially located above the first gear and the second gear is fixedly mounted on an outer side of the inner shell, and an upper end of the rotating shaft on the first gear and the second gear is rotatably connected to the bracket;

a positioning ring is sheathed on an outer periphery of the mounting cylinder, a baffle is provided above the mounting cylinder, the baffle is connected to the outer shell, a first plug-in portion is respectively provided on opposite sides of the positioning ring, a second plug-in portion is respectively provided on the bracket and the baffle, and the first plug-in portion and the second plug-in portion are plugged into each other for positioning; and the first plug-in portion is a plug-in column, and the second plug-in portion is a plug-in sleeve, or the first plug-in portion is a plug-in sleeve, and the second plug-in portion is a plug-in column, and the plug-in column is plugged into the plug-in sleeve.

15. The massager according to claim 11, wherein an outer side of the outer shell is formed with a long-shaped recess provided along the first direction of the outer shell, at least part of the mounting portion and at least part of the mounting cylinder are arranged in the long-shaped recess, and the long-shaped guide hole is arranged on an inner wall of the long-shaped recess or a side wall of a second mouth portion of the long-shaped recess.

16. The massager according to claim 15, wherein a notch is provided on the long-shaped recess, a curved supplementing piece is mounted at the notch, and one end edge of the curved supplementing piece and one end edge of the notch form a through opening.

17. The massager according to claim 1, wherein the reciprocating displacement drive assembly further comprises at least one linear guide member fixed in the accommodating cavity, the reciprocating displacement drive assembly comprises an actuating portion and at least one sliding portion, the long-shaped groove is arranged on a bottom surface of the actuating portion, the sliding portion is in a sliding fit with the linear guide member, a connecting portion of the sliding portion passes through the long-shaped guide hole of the outer shell and is connected with the mounting portion, and the actuating portion is connected with the at least one sliding portion.

18. The massager according to claim 17, wherein the sliding portion is further connected with the actuating portion by a connecting piece.

19. A massager, comprising:

a massaging member;

an outer shell comprising an accommodating cavity; and a driver mounted in the accommodating cavity, the driver comprising a reciprocating displacement drive assembly and a mounting portion located outside the outer shell in a suspended state, a connecting portion of the reciprocating displacement drive assembly penetrating a long-shaped guide hole on the outer shell and being connected with the mounting portion, and the massaging member being at least partially connected with the mounting portion in a plug-in manner, so that the reciprocating displacement drive assembly driving the mounting portion to perform a reciprocating linear displacement action along a first direction of the outer shell to cause the massaging member to perform a reciprocating telescopic motion; and an outer side of the outer shell is formed with a long-shaped recess provided along the first direction of the outer shell, the mounting portion is at least partially arranged in the long-shaped recess, and the long-shaped guide hole is arranged on an inner wall of the long-shaped recess or a side wall of a second mouth portion of the long-shaped recess.

* * * * *